(12) United States Patent
Marumoto

(10) Patent No.: US 8,123,644 B2
(45) Date of Patent: Feb. 28, 2012

(54) TRACTION-DRIVE TYPE DRIVING-FORCE TRANSMISSION MECHANISM AND IMAGE FORMING APPARATUS EQUIPPED THEREWITH

(75) Inventor: Takeshi Marumoto, Osaka (JP)

(73) Assignee: Kyocera Mita Corporation (JP)

( * ) Notice: Subject to any disclaimer, the term of this patent is extended or adjusted under 35 U.S.C. 154(b) by 715 days.

(21) Appl. No.: 12/269,961

(22) Filed: Nov. 13, 2008

(65) Prior Publication Data

US 2009/0124447 A1    May 14, 2009

(30) Foreign Application Priority Data

Nov. 13, 2007  (JP) ................................ 2007-294293
Nov. 13, 2007  (JP) ................................ 2007-294298
Nov. 13, 2007  (JP) ................................ 2007-294299
Nov. 13, 2007  (JP) ................................ 2007-294300
Nov. 13, 2007  (JP) ................................ 2007-294301

(51) Int. Cl.
*F16H 15/48* (2006.01)
*F16H 13/14* (2006.01)
*F16H 13/10* (2006.01)
(52) U.S. Cl. ............. 475/195; 475/194; 476/65; 476/66
(58) Field of Classification Search .................. 475/185, 475/194, 195; 476/65, 66
See application file for complete search history.

(56) References Cited

U.S. PATENT DOCUMENTS 1,981,582 A * 11/1934 Colucci ......................... 475/185
(Continued)

FOREIGN PATENT DOCUMENTS

JP          59-226752       12/1984
(Continued)

*Primary Examiner* — Tisha Lewis
(74) *Attorney, Agent, or Firm* — Gerald E. Hespos; Michael J. Porco

(57) ABSTRACT

A traction-drive type driving-force transmission mechanism has a sun roller. Planetary roller units are orbitally movable along an outer surface of the sun roller. A pressing member presses the planetary roller units toward the outer surface of the sun roller and allows a driving force to be transmitted by a traction force between the sun roller and the planetary roller units. Each planetary roller unit includes a first planetary roller rotatably supported by a first shaft and adapted to move orbitally along the outer surface of the sun roller, and a second planetary roller rotatably supported by a second shaft while allowing an outer surface thereof to contact an outer surface of the first planetary roller and the pressing surface, and adapted to press the outer peripheral surface of the first planetary roller against the outer peripheral surface of the sun roller during orbital movement of the planetary roller unit.

19 Claims, 11 Drawing Sheets

U.S. PATENT DOCUMENTS

| | | | | |
|---|---|---|---|---|
| 2,939,345 A | * | 6/1960 | Burns | 475/185 |
| 3,364,761 A | * | 1/1968 | Nasvytis | 476/61 |
| 3,433,099 A | * | 3/1969 | Nasvytis | 475/195 |
| 4,487,090 A | * | 12/1984 | Burnham | 475/183 |
| 5,122,099 A | * | 6/1992 | Boedo et al. | 475/187 |
| 5,238,459 A | * | 8/1993 | Andre | 475/183 |
| 7,118,512 B2 | * | 10/2006 | Flugrad et al. | 476/33 |

FOREIGN PATENT DOCUMENTS

JP   2000-329206   11/2000

* cited by examiner

TRACTION-DRIVE TYPE DRIVING-FORCE TRANSMISSION MECHANISM AND IMAGE FORMING APPARATUS EQUIPPED THEREWITH

BACKGROUND OF THE INVENTION

1. Field of the Invention

The present invention relates to a traction-drive type driving-force transmission mechanism capable of transmitting a driving force or reducing a rotational speed, through means of a traction force generated between rollers, and an image forming apparatus equipped with the traction-drive type driving-force transmission mechanism.

2. Description of the Related Art

As a conventional technique relating to traction-drive type driving-force transmission mechanisms, there has been known a mechanism which comprises a sun roller coupled to a rotary shaft, a plurality of planetary rollers arranged around the sun roller, and a carrier supporting respective planetary shafts of the planetary rollers (see, for example, JP 2000-329206A, which will hereinafter be referred to as "document D1"). The mechanism disclosed in the document D1 is designed such that each of the planetary rollers is rotated through means of a traction force generated between the sun roller and each of the planetary rollers, and a movement of each of the planetary rollers orbited around the sun roller along a pair of orbit rings is transmitted from the carrier to an output shaft.

In order to generate a sufficient traction force between the sun roller and each of the planetary rollers, it is necessary to strongly press the planetary roller against the sun roller (i.e., bring the planetary roller into press contact with the sun roller) in the presence of a lubricant while rotatably supporting the planetary roller by the corresponding planetary shaft. For this purpose, in the mechanism disclosed in the document D1, the planetary shaft and the planetary roller are formed and arranged to ensure a certain gap therebetween, and the pair of orbit rings are disposed to sandwich therebetween the planetary roller in such a manner that an inclined surface formed in an inner periphery of each of the orbit rings is brought into press contact with an inclined portion (inclined surface) formed on each of axially opposite lateral sides of the planetary roller, to allow the planetary roller to be pressed against an outer peripheral surface of the sun roller.

In the mechanism disclosed in the document D1, each of the planetary rollers is adapted to be freely displaceable relative to the planetary shaft within the range of the gap, although the planetary shaft is fixed to the carrier. Thus, when the orbit rings are brought into press contact with the respective inclined surfaces of the planetary rollers, the planetary rollers will be strongly pressed against the sun roller, so that a required traction force can be generated in the presence of a lubricant.

However, the mechanism disclosed in the document D1 requires using the two orbit rings made of a costly material, such as tool steel, and the resulting increase in material cost will lead directly to an increase in product cost. Moreover, due to an increase in the number of components requiring high-accuracy assembling, such as the orbit rings, an assembling process becomes complicated, which leads to a problem about an increase in production cost.

Further, in the mechanism disclosed in the document D1, the planetary shaft and the planetary roller are arranged to define a gap therebetween. This technique involves a possibility that a rotation axis (rotation central axis) of the planetary roller is displaced at a certain amount of angle with respect to an axis (central axis) of the planetary shaft. Thus, when the planetary roller is pressed against the sun roller, an outer peripheral surface of the planetary roller is likely to be slightly inclined relative to the outer peripheral surface of the sun roller. In this case, a pressure distribution on the outer peripheral surface of the planetary roller becomes uneven in an axial direction of the planetary roller, and thereby so-called "edge contact" occurs to cause uneven wear (i.e., partial or local wear) on the outer peripheral surface of the sun roller. Thus, this technique is undesirable in view of achieving a longer product lifetime.

Furthermore, in order to meet the need for applying a high pressing force between a pressing member (in the document D1, the orbit rings) adapted to press the planetary roller against the sun roller, and the planetary roller, and between the planetary roller and the sun roller, these components are assembled together to allow the pressing force to be already applied therebetween just after completion of the assembling. That is, in the mechanism disclosed in the document D1, the pressing force is applied between the above components even in a non-driving state. In this respect, this technique has a problem of being unable to obtain a long-lifetime traction-drive type driving-force transmission mechanism.

SUMMARY OF THE INVENTION

It is an object of the present invention to provide a traction-drive type driving-force transmission mechanism capable of allowing automatic adjustment of a pressing force and usable until a lifetime limit of an apparatus equipped therewith.

In order to achieve this object, according to one aspect of the present invention, there is provided a traction-drive type driving-force transmission mechanism which comprises: a sun roller having a first central axis and being rotatable about the first central axis; a plurality of planetary roller units each provided in such a manner as to be orbitally movable along an outer peripheral surface of the sun roller; and a pressing member which has a pressing surface surrounding the planetary roller units to press the planetary roller units toward the outer peripheral surface of the sun roller, and allows a driving force to be transmitted through means of a traction force between the sun roller and each of the planetary roller units, wherein each of the planetary roller units includes: first and second shaft members having respective second central axes and being disposed such that the second central axes are aligned with respective ones of two peripheral axes extending in parallel relation to the first central axis and in spaced-apart relation to each other; a first planetary roller rotatably supported by the first shaft member, and adapted to be orbitally moved along the outer peripheral surface of the sun roller; and a second planetary roller rotatably supported by the second shaft member while allowing an outer peripheral surface thereof to be in contact with an outer peripheral surface of the first planetary roller and the pressing surface, and adapted, during orbital movement of the planetary roller unit along the outer peripheral surface of the sun roller, to press the outer peripheral surface of the first planetary roller against the outer peripheral surface of the sun roller.

According to another aspect of the present invention, there is provided an image forming apparatus which comprises: an image forming section including at least a photosensitive drum, or a photosensitive drum and an intermediate transfer belt; a driving source operable to generate a driving force for driving the photosensitive drum, or at least one of the photosensitive drum and the intermediate transfer belt; and a traction-drive type driving-force transmission mechanism operable to transmit the driving force of the driving source to a rotary shaft of the photosensitive drum, or a driving member of the intermediate transfer belt, wherein the traction-drive type driving-force transmission mechanism has the above feature.

DETAILED DESCRIPTION OF THE PREFERRED EMBODIMENTS

Figure 1A:
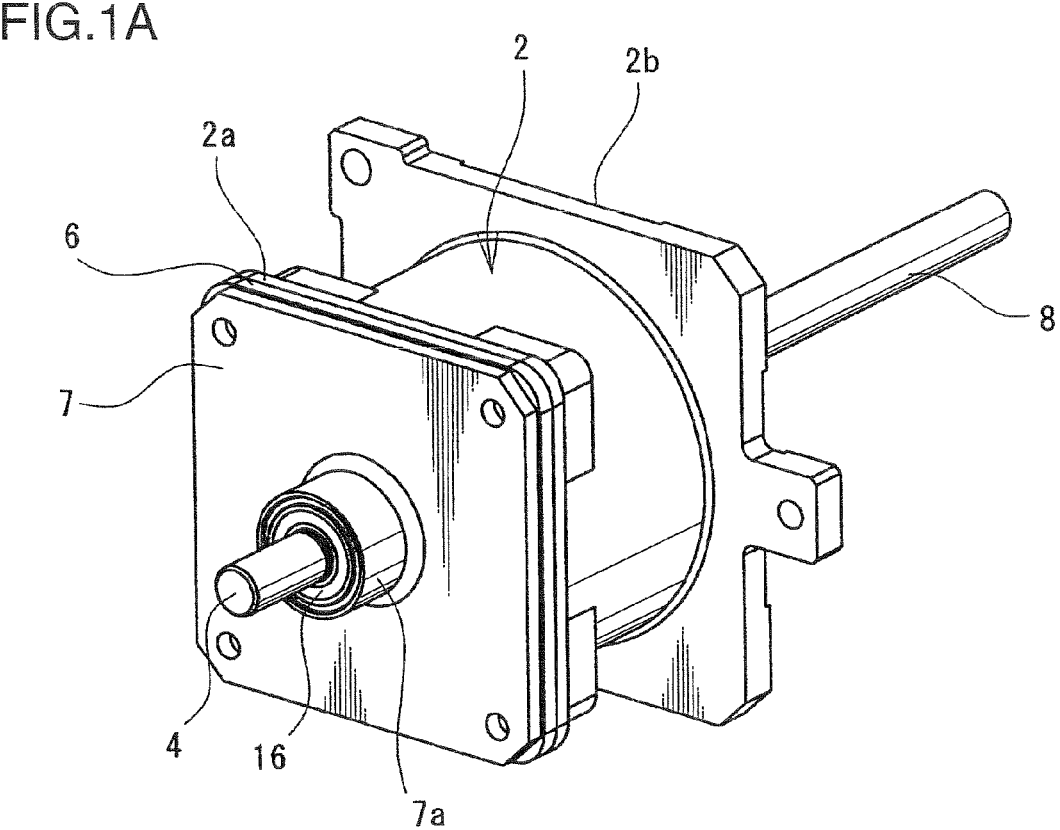
FIGS. 1A and 1B are perspective views showing an external appearance of a traction-drive type driving-force transmission mechanism according to one embodiment of the present invention, when viewed from two different directions.
Figure 1B:
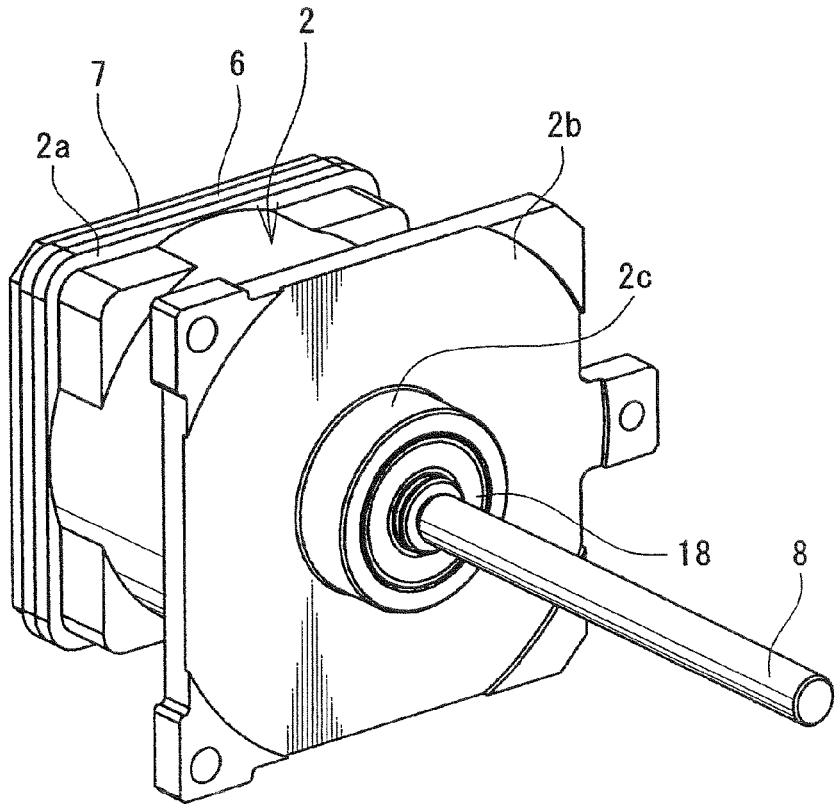

With reference to the drawings, the present invention will now be specifically described based on an embodiment thereof. FIGS. 1A and 1B are perspective views showing an external appearance of a traction-drive type driving-force transmission mechanism M according to one embodiment of the present invention, when viewed from two different directions. The traction-drive type driving-force transmission mechanism M comprises a cylindrical-shaped casing 2, a sun roller 4, an end plate 6, a bearing plate 7, and an output shaft 8.

The casing 2 has a rectangular-shaped flange 2a formed at one end thereof, and the flange 2a is formed with an opening which is closed by the end plate 6 having a shape corresponding to that of the flange 2a. The casing 2 further has a rectangular-shaped flange 2b formed at the other end on an opposite side of the flange 2a. The traction-drive type driving-force transmission mechanism M is adapted to be connected, but not shown, to a driving source (e.g., motor) disposed on the side of the flange 2a.

One end (i.e., distal end) of the sun roller 4 is received inside the casing 2, and the output shaft 8 is disposed to protrude from the inside of the casing 2 and extend in an opposite direction of the sun roller 4. The bearing plate 7 is attached to the end plate 6, and formed with a boss portion 7a in a central region thereof. The boss portion 7a is internally provided with a bearing 16, and the sun roller 4 is supported by the bearing plate 7 (casing 2) through the bearing 16. The flange 2b also has a boss portion 2c which is formed in a central region thereof and internally provided with a bearing 18. The output shaft 8 is supported by the flange 2b (casing 2) through the bearing 18.

Figure 2:
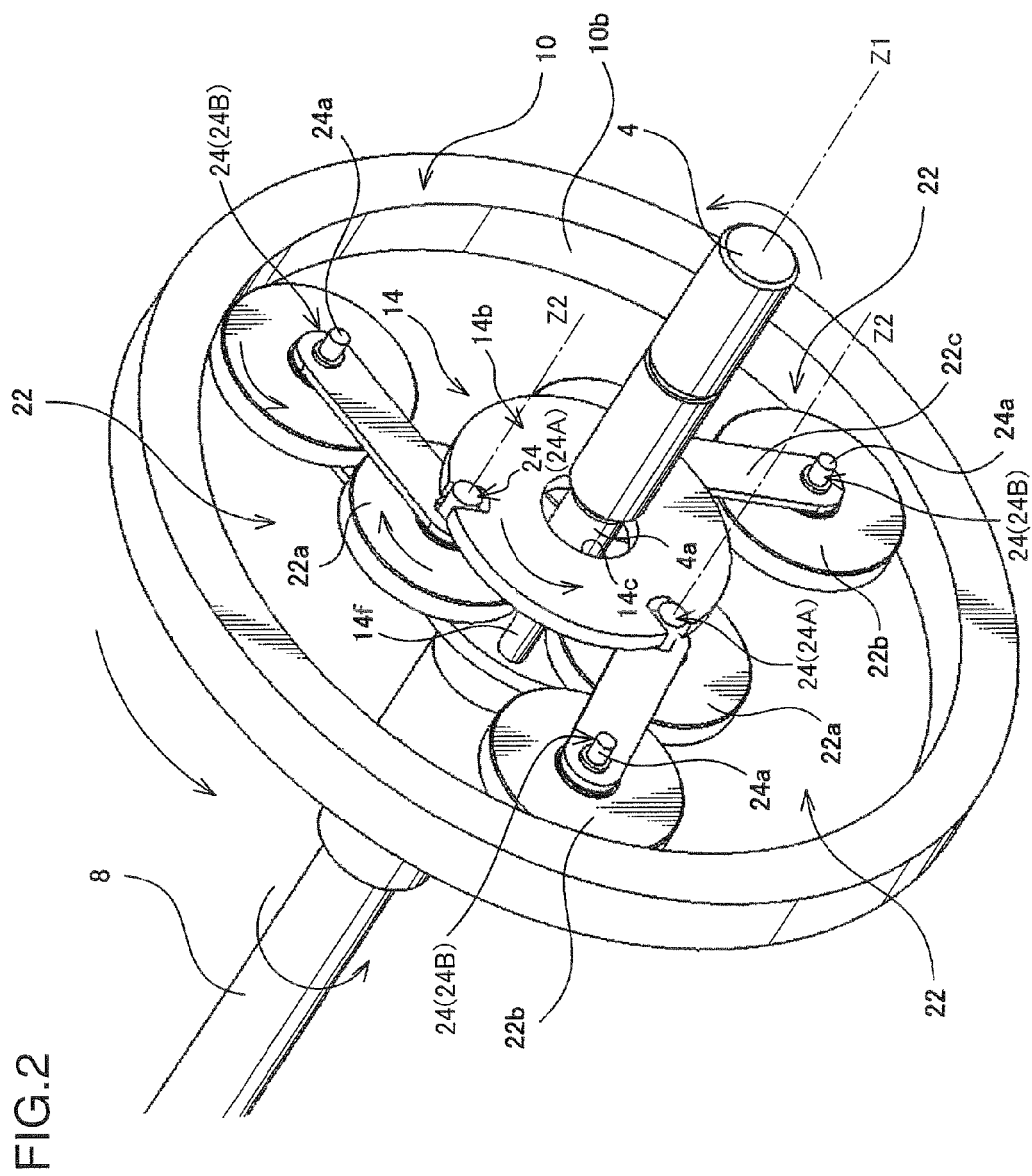
FIG. 2 is a fragmentary perspective view showing the traction-drive type driving-force transmission mechanism, when viewed from the side of a sun roller.
Figure 3:
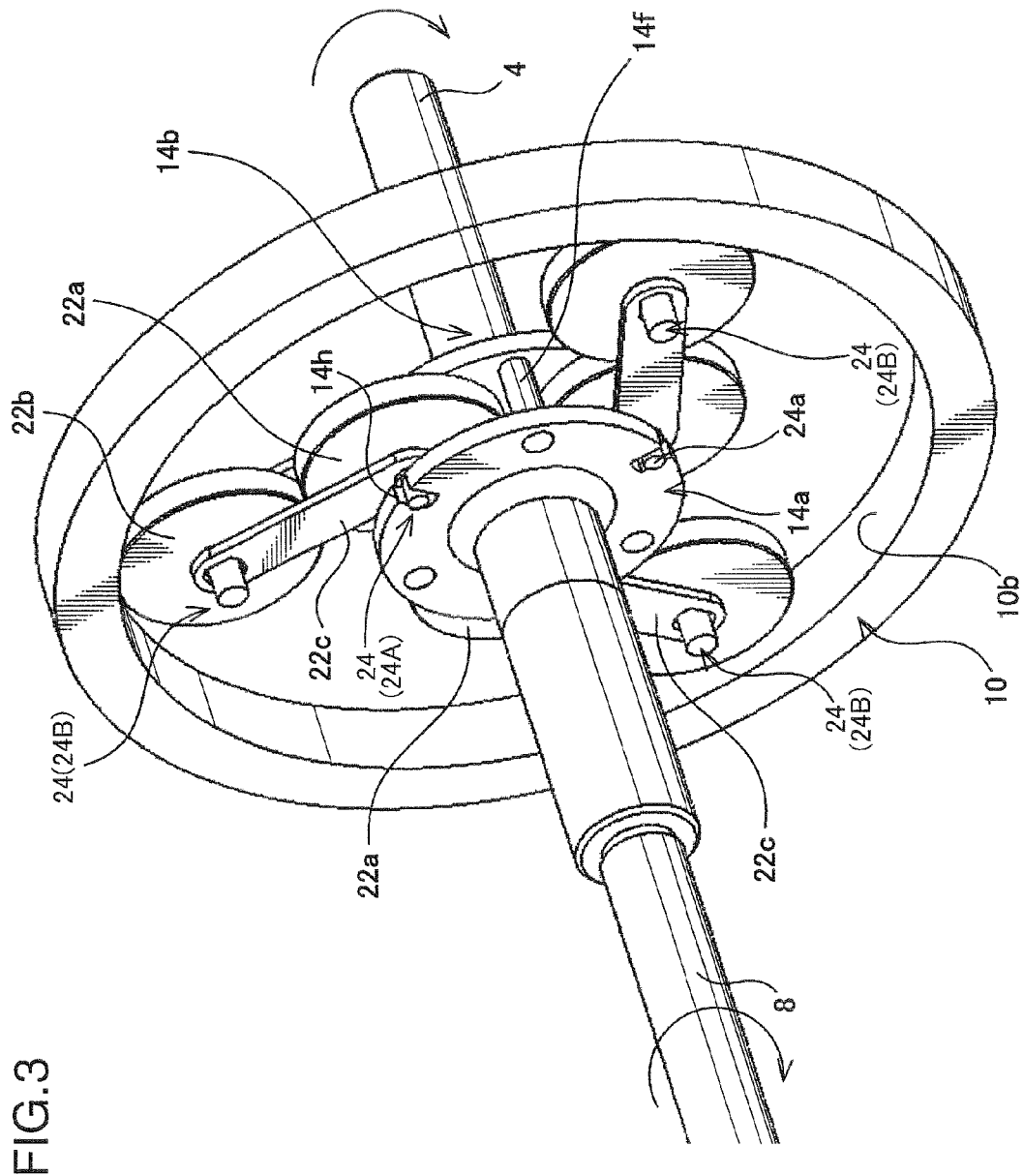
FIG. 3 is a fragmentary perspective view showing the traction-drive type driving-force transmission mechanism, when viewed from the side of an output shaft.

FIGS. 2 and 3 are perspective views showing the traction-drive type driving-force transmission mechanism M in a state after the casing 2 is removed therefrom. The casing 2 receives therein the sun roller 4, one outer ring 10 (serving as a pressing member), a planetary carrier 14 (serving as a guide member), three planetary roller units 22, and one end (i.e., base end) of the output shaft 8. The planetary carrier 14 includes a first carrier member 14a and a second carrier member 14b, and the three planetary roller units 22 are supported by the two carrier members. Each of the planetary roller units 22 includes a pair of a first planetary roller 22a and a second planetary roller 22b.

The outer ring 10 has a pressing surface 10b which surrounds the three planetary roller units 22 to press each of the planetary roller units 22 (first planetary roller 22a) toward an outer peripheral surface of the sun roller 4. This pressing surface 10b is contactable with each of the planetary roller units 22. The outer ring 10 is formed to have an outer diameter slightly less than an inner diameter of the casing 2, and disposed inside the casing 2 with a given gap therebetween. The casing 2 is internally filled with a lubricant (e.g., grease), and the bearing 16 and the bearing 18 are capable of sealing the grease contained in the casing 2.

The planetary carrier 14 is a member integrally connected to the output shaft 8 and adapted to be integrally rotated together with the output shaft 8. The planetary carrier 14 is adapted to guide each of the first planetary rollers 22a in such a manner as to be displaceable in a radial direction of the sun roller 4, while maintaining parallel relation between a first central axis of the sun roller 4 and a second central axis of the first planetary roller 22a. The details of the planetary carrier 14 will be described later.

Each of the planetary roller units 22 is adapted to be orbitally moved around the sun roller 4. Although this embodiment shows the three planetary roller units 22 as an example, the number of the planetary roller units 22 may be any plural number other than three. The details of the planetary roller units 22 will also be described later.

Preferably, each of the four components consisting of the sun roller 4, the first planetary roller 22a, the second planetary roller 22b and the outer ring 10 is made of a material having a relatively high hardness, particularly, a material having a hardness equal to or greater than that of die steel. For example, the sun roller 4 may be made of a material prepared by subjecting a raw material based on SKH (one type of high-speed steel) defined by JIS G4403 to a quenching/tempering treatment at an appropriate temperature. Each of the first planetary roller 22a and the second planetary roller 22b may be made of a material prepared by subjecting a raw material based on SKD (one type of alloy tool steel) defined by JIS G4404 to a quenching treatment at an appropriate temperature. The outer ring 10 may be made of NAK (trade name of a material for a plastic molding die, produced by Daido Steel Co., Ltd.; pre-hardened steel which is one type of die steel) directly without subjecting it to a quenching treatment.

More specifically, the sun roller 4, each of the first and second planetary rollers 22a, 22b, and the outer ring 10, may be made of SKH 51, SKD 11, and NAK 55 (trade name, produced by Daido Steel Co., Ltd.), respectively. The SKH 51 for the sun roller 4, the SKD 11 for the first and second planetary rollers 22a, 22b, and the NAK 55 for the outer ring 10, have micro-Vickers hardnesses Hv of about 700, about 520 and about 450, respectively.

In this embodiment, each of the four components consisting of the sun roller 4, the first planetary roller 22a, the second planetary roller 22b and the outer ring 10 is made of a material having a hardness set to become higher in descending order of surface velocity in respective press contact portions of the components. Specifically, each of the sun roller 4, the first or second planetary roller 22a (22b), and the outer ring 10, is made of a material having a hardness set to become higher in this order. In this case, as compared with a case where each of the four components is made of the same material, a lifetime capable of satisfying a target wow and flutter value can be extended about three times, under the same load condition. This makes it possible to retard performance deterioration due to seizing or wearing, and provide enhanced wear resistance.

Preferably, at least one of the four components consisting of the sun roller 4, the first planetary roller 22a, the second planetary roller 22b and the outer ring 10, which is to be driven at a maximum value of surface velocity in respective press contact portions thereof, more specifically the sun roller 4, has a surface subjected to a micro-shot peening treatment (WPC treatment). This treatment comprises bringing ceramic or glass particles having a particle size of about 10 μm (1 μm=1×10$^{-6}$ m) into collision with the surface of the component at sonic speed. This makes it possible to provide enhanced wear resistance to the sun roller 4.

In the sun roller 4 subjected to the micro-shot peening treatment, as compared with a sun roller which is not subjected to this treatment, a lifetime capable of satisfying a target wow and flutter value can be extended about 1.5 times, under the same load condition. This makes it possible to extend a lifetime of the traction-drive type driving-force transmission mechanism M.

Figure 4:
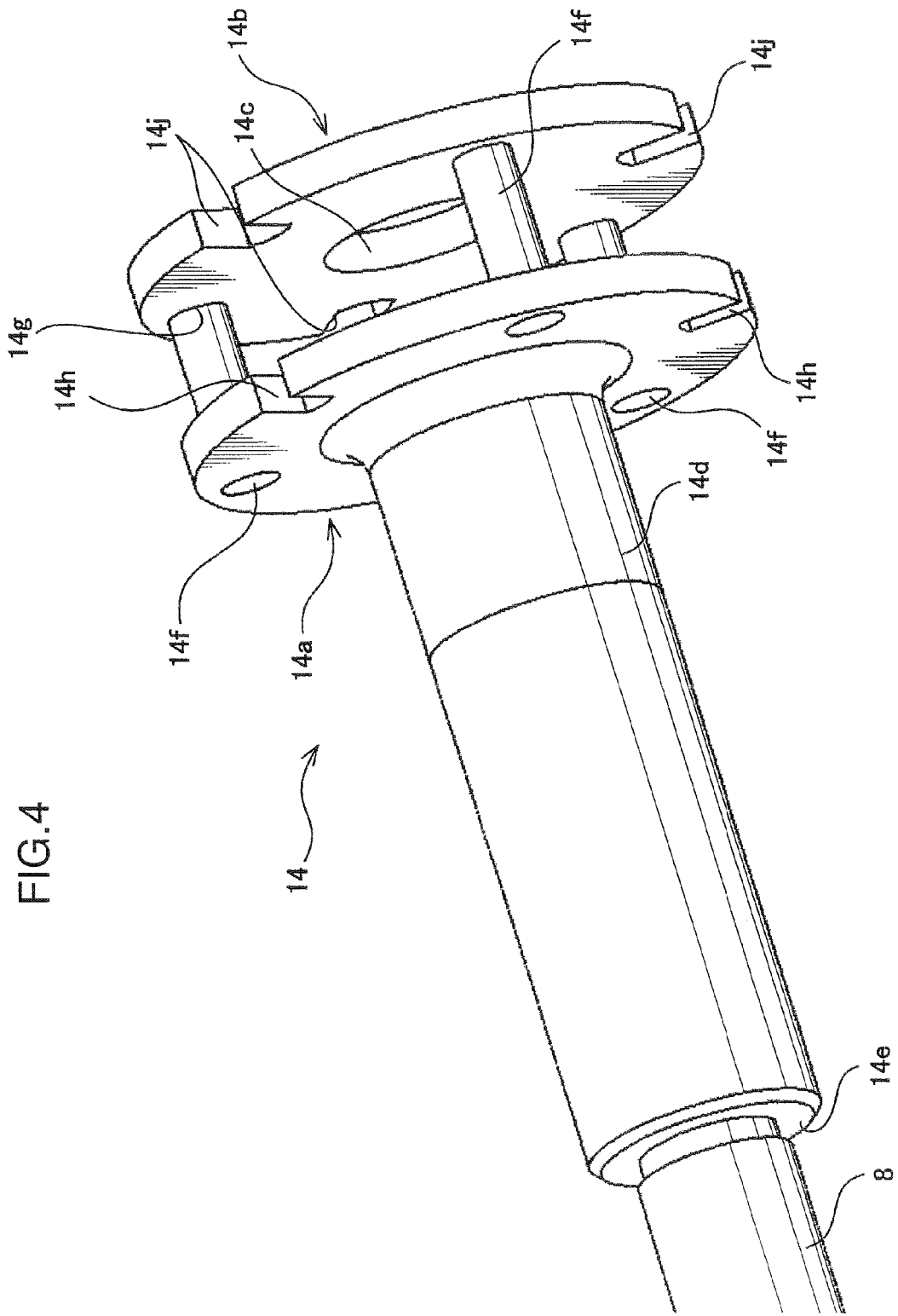
FIG. 4 is a perspective view showing a planetary carrier and the output shaft illustrated in FIG. 2.

With reference to FIG. 4, a structure of the planetary carrier 14 will be specifically described below. The planetary carrier 14 includes the first carrier member 14a and the second carrier member 14b, as mentioned above. Specifically, as shown in FIG. 4, each of the first and second carrier members 14a, 14b has a generally circular disk shape.

The second carrier member 14b has an insertion hole 14c in a central region thereof. The insertion hole 14c is formed to have an inner diameter greater than an outer diameter of the sun roller 4. Thus, the second carrier member 14b can be freely rotated around the sun roller 4.

The first carrier member 14a has a boss portion 14d formed on a central region of an outer surface thereof on the side of the output shaft 8. The boss portion 14d is connected to a coupling portion 14e, and the base end of the output shaft 8 is fitted (press-fitted) into an end of the coupling portion 14e. Further, the first carrier member 14a has a bearing (not shown) in an inner surface on the opposite side of the boss portion 14d (on the side opposed to the second carrier member 14b), and the distal end of the sun roller 4 is rotatably supported by the bearing.

The first carrier member 14a has three connection portions 14f formed in the vicinity of an outer periphery thereof. The three connection portions 14f are arranged at even intervals (at intervals of 120 degrees) in a circumferential direction of the first carrier member 14a. In an assembled state of the planetary carrier 14, each of the connection portions 14f extends from the first carrier member 14a toward the second carrier member 14b in parallel relation to the sun roller 4. The second carrier member 14b disposed in opposed relation to the first carrier member 14a has three fitting concave portions 14g formed correspondingly to the respective connection portions 14f. Each of the fitting concave portions 14g is formed to be concaved from a surface of the second carrier member 14b facing the first carrier member 14a, in a thicknesswise direction of the second carrier member 14b.

The connection portions 14f are fitted into the corresponding fitting concave portions 14g to assemble the first and second carrier members 14a, 14b of the planetary carrier 14 together in such a manner that a distance therebetween in a direction of a rotation axis (first central axis) of the sun roller 4 is unchangeably maintained. Particularly, in this embodiment, the connection portions 14f and the fitting concave portions 14g are machined with a high degree of accuracy, and fitted together with a high degree of accuracy, to limit a rotational displacement (wobbling movement) thereof about the rotation axis to a significantly small value.

The first carrier member 14a has three guide grooves 14h formed in the outer peripheral edge thereof. The second carrier member 14b has three guide grooves 14j formed at positions (i.e., symmetrical positions) corresponding to respective positions of the guide grooves 14h in the rotation axis of the sun roller 4. The guide grooves 14h (14j) are arranged at even intervals (at intervals of 120 degrees) in the circumferential direction of the first (second) carrier member 14a (14b), and each of the guide grooves 14h (14j) is formed to extend from the outer peripheral edge toward a rotation center (radially central region) of the first (second) carrier member 14a (14b). In this embodiment, each of the guide grooves 14j is formed to have a width greater than that of each of the guide grooves 14h.

Figure 5:
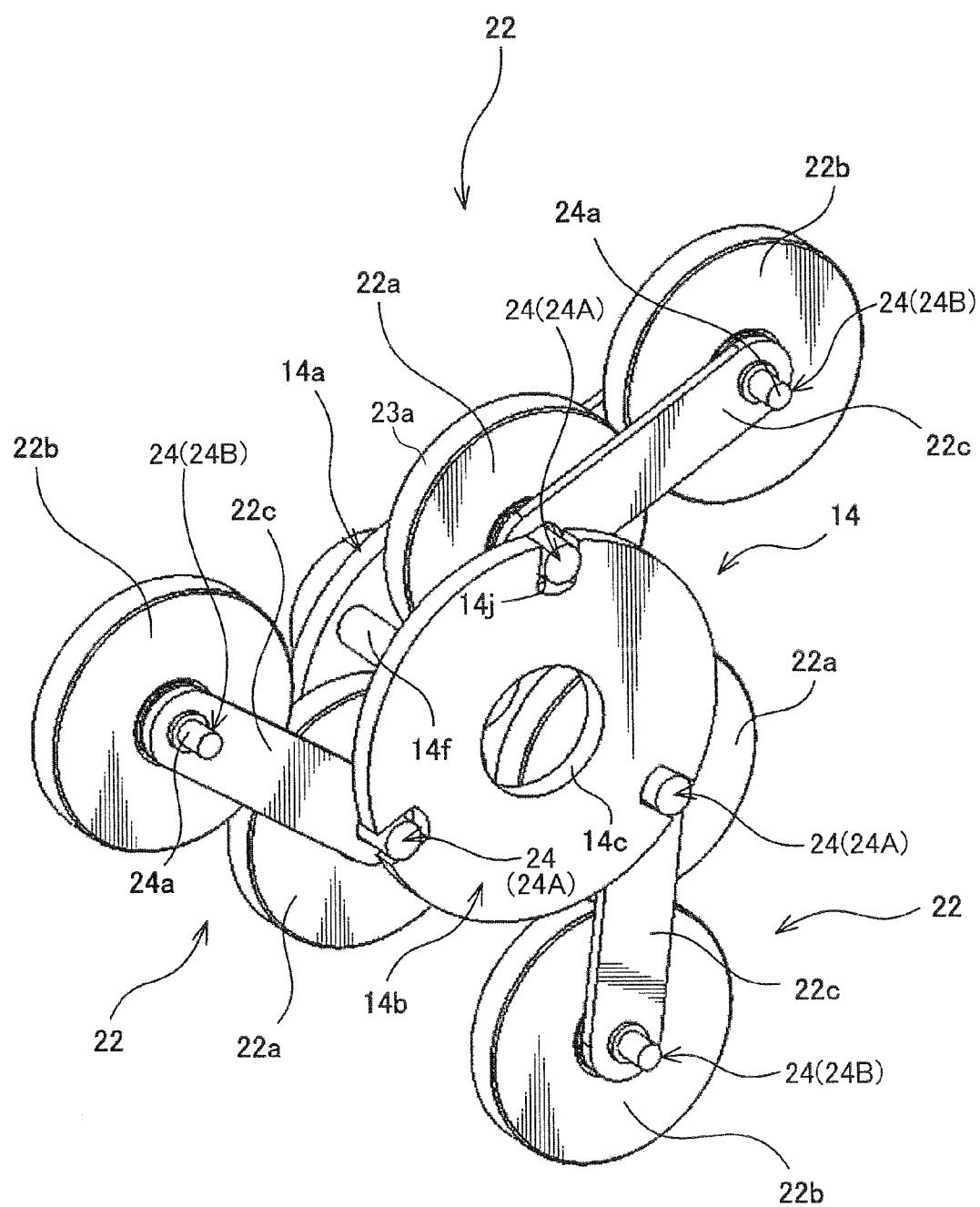
FIG. 5 is a perspective view showing the planetary carrier and a planetary roller unit illustrated in FIG. 2.
Figure 6:
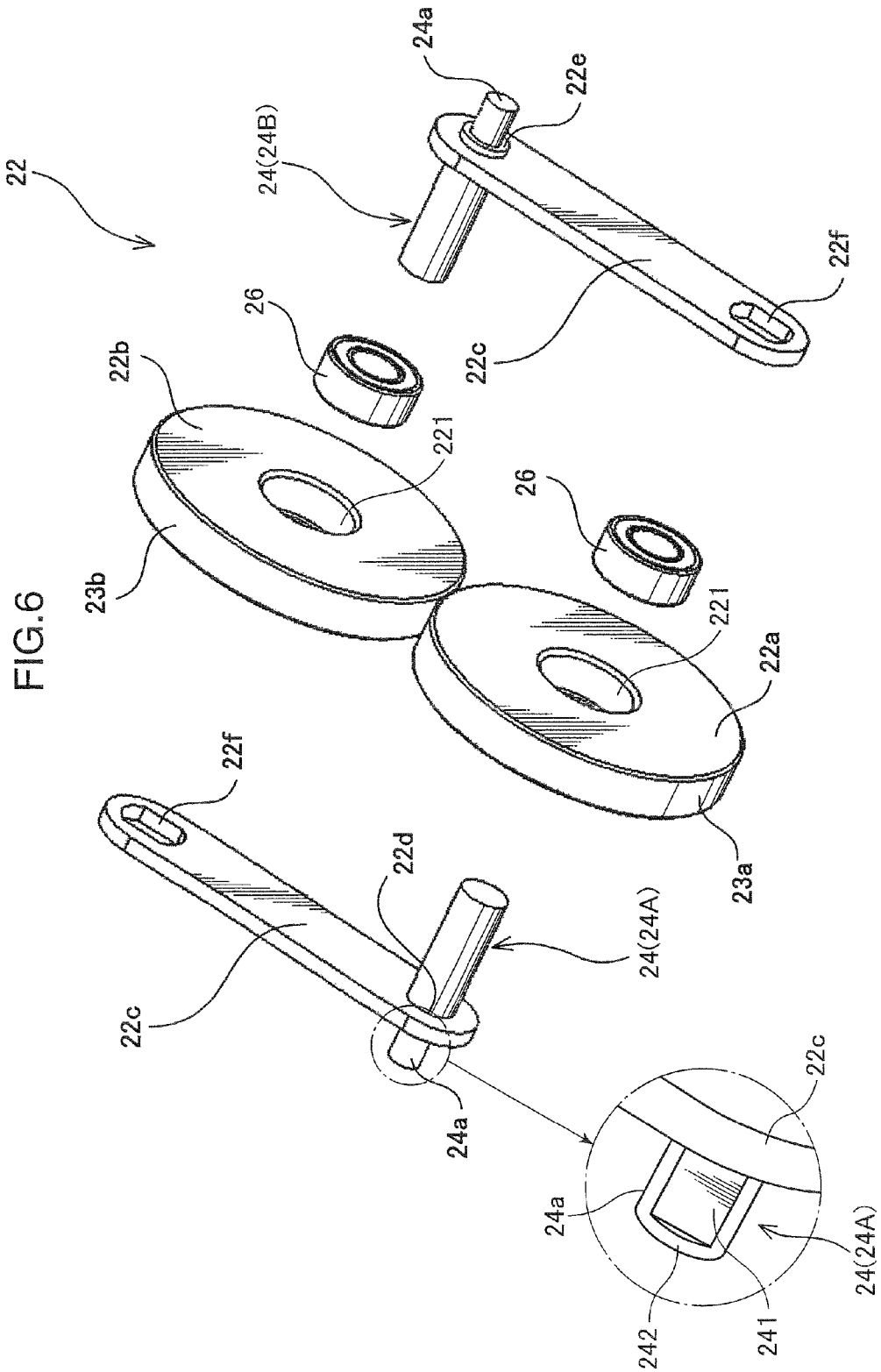
FIG. 6 is an exploded perspective view showing the planetary roller unit.

With reference to FIGS. 2, 5 and 6, the planetary roller units 22 will be specifically described below. FIG. 5 is a perspective view showing the planetary carrier 14 and the planetary roller units 22, and FIG. 6 is an exploded perspective view showing the planetary roller unit 22. The three planetary roller units 22 are arranged at even intervals (at intervals of 120 degrees) in the circumferential direction of the sun roller 4. Each of the planetary roller units 22 includes a first planetary roller 22a, a shaft member 24 (first shaft member 24A) rotatably supporting the first planetary roller 22a, a second planetary roller 22b, a shaft member 24 (second shaft member 24B) rotatably supporting the second planetary roller 22b, a support arm 22c (serving as a link member) connecting the pair of shaft members 24, and two bearings 26 each rotatably supporting a respective one of the first and second planetary rollers 22a, 22b about an associated one of the shaft members 24.

The three first planetary rollers 22a included in the three planetary roller units 22 are disposed on respective ones of three peripheral axes parallel to the rotation axis Z1 (first central axis; see FIG. 2) of the sun roller 4, and at even intervals (at intervals of 120 degrees) in the circumferential direction of the sun roller 4. That is, the three first planetary rollers 22a supported by the respective first shaft members 24A are disposed around the sun roller 4 in such a manner that a central axis Z2 (second central axis) of each of the first shaft members 24A (a rotation axis of each of the first planetary rollers 22a) is aligned with a respective one of the three peripheral axes, i.e., becomes parallel to the rotation axis Z1 of the sun roller 4.

Based on the above arrangement relationship, the three first planetary rollers 22a are interposed in a space defined between the first and second carrier members 14a, 14b, and supported by the first and second carrier members 14a, 14b through the respective first shaft members 24A. In this state, each of the first planetary rollers 22a is adapted to be orbited (orbitally moved) along the outer peripheral surface 4a of the sun roller 4. In a state before the sun roller 4 is rotated, an outer peripheral surface 23a of the first planetary roller 22a is in contact with the outer peripheral surface 4a of the sun roller 4, to an extent that a torque is transmitted from the sun roller 4 to the first planetary roller 22a.

In each of the planetary roller units 22, the second planetary roller 22b is disposed on an outward side of the first planetary roller 22a. In this embodiment, a total number of the second planetary rollers 22b is three, and the three second planetary rollers 22b are paired with the respective first planetary rollers 22a. The second planetary roller 22b is composed of a component identical to that of the first planetary roller 22a. The second planetary roller 22b is rotatably supported by a second shaft member 24B, in the same manner as that in the first planetary roller 22a. The second shaft member 24B also has a rotation axis parallel to the rotation axis Z1 of the sun roller 4. The second planetary roller 22b has an outer peripheral surface 23b in contact with both the pressing surface 10b of the outer ring 10 and the outer peripheral surface 23a of the first planetary roller 22a.

In each of the planetary roller units 22, the first shaft member 24A and the second shaft member 24B are connected together through the plate-shaped planetary roller support arm 22c to form a planetary roller pair consisting of the singe first planetary roller 22a and the single second planetary roller 22b.

More specifically, as shown in FIG. 6, each of the first planetary roller 22a and the second planetary roller 22b has an insertion hole 221 formed in a central region thereof. The insertion hole 221 is formed to have a size allowing a bearing 26 to be press-fitted thereinto. The first shaft member 24A and the second shaft member 24B are inserted, respectively, into the bearing 26 press-fitted into the insertion hole 221 of the first planetary roller 22a and the bearing 26 press-fitted into the insertion hole 221 of the second planetary roller 22b, so that each of the first and second planetary rollers 22a, 22b is rotatably attached to a corresponding one of the first and second shaft members 24A, 24B through the bearing 26.

In each of the planetary roller units 22, the planetary roller support arm 22c includes a first support arm disposed on one of opposite sides of the first and second planetary rollers 22a, 22b, and a second support arm on the other side. The first and second support arms 22c are composed of identical components. Each of the first and second support arms 22c has one end formed with a circular through-hole 22d, and the other end formed with an elongate through-hole 22f. Each of the shaft members 24 (first and second shaft members 24A, 24B) has a large-diameter portion and a small-diameter portion arranged in the axial direction thereof.

The small-diameter portion of the shaft member 24 is inserted into the circular through-hole 22d of the support arm 22c, and fastened to the support arm 22c by a crimp ring 22e. The small-diameter portion of the shaft member 24 has a pair of opposed parallel surfaces formed by a cutting process. The pair of parallel surfaces are formed symmetrically with respect to the central axis of the shaft member 24 and in parallel relation to each other. That is, a first end (on the side of the small-diameter portion) of the shaft member 24 having the parallel surfaces is formed as an oval-shaped portion 24a (i.e., a portion having an oval shape in section).

The oval-shaped portion 24a is located on a slightly inward side relative to an edge of the first end of the shaft member 24. Thus, as shown in the enlarged view circled by the one-dot chain line in FIG. 6, a sectionally circular-shaped portion remains in the first end of the shaft member 24 on an outward side relative to the parallel surfaces 24a (i.e., on the side of the edge of the first end). This portion serves as a first latch portion 242. In a state after the shaft member 24 is fitted into the guide groove 14h, the first latch portion 242 is positioned to protrude from the first carrier member 14a outwardly (i.e., on the opposite side of the first and second planetary rollers 22a, 22b), and retained by the outer surface of the first carrier member 14a.

Although not illustrated, the other, second end (on the side of the large-diameter portion) of the shaft members 24 also has a second latch portion formed at an edge thereof. The second end is formed in a sectionally circular shape without an oval-shaped portion, and the second latch portion is formed to have a diameter greater than that of the remaining region. In a state after the shaft member 24 is fitted into the guide groove 14j, the second latch portion is also positioned to protrude outwardly from the second carrier member 14b, and retained by an outer surface of the second carrier member 14b. In a practical sense, only the first shaft member 24A may be formed in such a latching configuration. However, it is understood that in the second shaft member 24B may be formed in the same configuration as that of the first shaft member 24A in view of commonization of components.

As above, in this embodiment, the first and second latch portions are formed on the respective opposite edges of the shaft member 24. Thus, as shown in FIG. 5, in the state after the shaft member 24 is fitted into the guide grooves 14h, 14j, the first and second latch portions prevent the first and second carrier members 14a, 14b from being separated from each other, so as to maintain the fitted state therebetween. Particularly, in this embodiment, a distance between respective inward edges of the first and second latch portions of the shaft member 24 is set to be slightly greater than the entire thickness dimension of the planetary carrier 14. Thus, in the state after the shaft member 24 is fitted into the guide grooves 14h, 14j, the shaft member 24 can be freely displaced within the guide grooves 14h, 14j in the radial direction of the sun roller 4.

In this embodiment, with a view to allowing the shaft member 24 (in this embodiment, the first shaft member 24A) to be displaceable only in the radial direction of the sun roller 4 while restraining any other displacement, the traction-drive type driving-force transmission mechanism has the following structural features.

Firstly, a width (distance) between the pair of parallel surfaces 241 in the oval-shaped portion 24a is set to be slightly less than a width of the guide groove 14h, when viewed in a radial direction of the shaft member 24. Specifically, with respect to the radial direction of the shaft member 24, the oval-shaped portion 24a (parallel surfaces 241) is fitted into the guide groove 14h with a slight gap therebetween with a high degree of accuracy. Thus, although the shaft member 24 is displaceable along the guide groove 14h in the radial direction of the sun roller 4, a rotational displacement of the shaft member 24 about the rotation axis Z 1 is restrained.

Secondly, with a focus on a longitudinal width of each of the parallel surfaces in the oval-shaped portion 24a, the longitudinal width is set to be slightly greater than a thickness of the first carrier member 14a. That is, with respect to a longitudinal direction of the shaft member 24 (i.e., in a direction of the central axis Z2), the oval-shaped portion 24a is fitted into the guide groove 14h with a slight gap therebetween with a high degree of accuracy. Thus, although the shaft member 24 is displaceable along the guide groove 14h in the radial direction of the sun roller 4, a displacement of the shaft member 24 in the longitudinal direction thereof (a direction of the rotation axis Z1) is restrained.

Further, a displacement of the shaft member 24 in a direction causing the central axis Z2 thereof to be inclined is restrained. Specifically, with respect to the longitudinal direction of the shaft member 24, two sectionally circular-shaped portions (latch portions 242) exist on both sides of the oval-shaped portion 24a. Thus, in a state after the oval-shaped portion 24a is fitted into the guide groove 14h, even if a certain force which otherwise causes the shaft member 24 to be inclined is applied, one of the latch portions 242 is brought into contact with the outer or inner surface of the first carrier member 14a to prevent the inclination of the shaft member 24.

This makes it possible to allow each of the shaft members 24 to be displaceable along the guide groove 14h only in the radial direction of the sun roller 4, while restraining a displacement in any other direction.

The bearings 26 are fitted into the respective planetary rollers 22a, 22b along the rotation axes thereof. Thus, in this embodiment, a dimensional tolerance for the components including the planetary rollers 22a, 22b, the bearings 26 and the shaft member 24 is set at a significantly small value. This makes it possible to assemble the planetary roller 22 to the shaft member 24 in a substantially integrated manner so as to provide a structure allowing the planetary roller 22 to be displaced only in the radial direction of the sun roller 4 within the planetary carrier 14.

In the traction-drive type driving-force transmission mechanism M, a sliding displacement of the first shaft member 24A (first planetary roller 22a) relative to the planetary carrier 14 is a critical factor. In this embodiment, with a view to allowing for a smooth displacement of the first shaft member 24A, the oval-shaped portion is formed only in the first end of the shaft member 24, and the second end is maintained in a sectionally circular shape, as described above. Specifically, if the oval-shaped portion is formed in each of the first and second ends, a machining error is likely to cause the occurrence of an angular difference between the oval-shaped portions on the first and second ends. This angular difference immediately exerts an adverse effect on the sliding displacement of the shaft member 24 to cause edge contact of the first planetary roller 22a and consequently cause uneven wear of the sun roller 4. On this point, in this embodiment, the oval-shaped portion is formed only in the first end of the shaft member 24. This is effective in allowing the first planetary roller 22a to be evenly pressed against the sun roller 4 without the risk of the occurrence of angular difference.

An assembling process of the planetary roller unit 22 will be described below. Firstly, the first planetary roller 22a and the second planetary roller 22b are serially arranged to allow the respective outer peripheral surfaces 23a, 23b thereof to be in contact with each other. Further, the first and second support arms 22c are arranged on the respective opposite sides of the planetary rollers 22a, 22b in such a manner that the circular through-hole 22d of one of the support arms 22c is disposed in alignment with the elongate through-hole 22f of the other support arm 22c.

Subsequently, the oval-shaped portion 24a of each of the shaft members 24 is inserted into the circular through-hole 22d of a corresponding one of the support arms 22c, and fastened to the support arm 22c by the crimp ring 22e. Then, the two bearings 26 are inserted into the respective insertion holes 221 of the planetary roller 22a, 22b, and the shaft members 24 are inserted into the respective bearings 26, so that the first and second planetary rollers 22a, 24b are rotatably attached to the first and second shaft members 24A, 24A through the bearings 26, respectively. Then, the second end of each of the shaft members 24 is inserted into the elongate through-hole 22f of the other support arm 22c. In this manner, the planetary roller unit 22 is completed. In the assembled state, the second end of each of the shaft members 24 is displaceable along the elongate through-hole 22f of the support arm 22c, so that the shaft members 24 can be orbitally moved in the circumferential direction of the sun roller 4 while being held in a centering manner by the bearings 26.

Subsequently, the oval-shaped portion 24a of the first shaft member 24A supporting the first planetary roller 22a is fitted into the guide groove 14h of the first carrier member 14a, and the second end (end on the side of the large-diameter portion) of the first shaft member 24A is fitted into the guide groove 14j of the second carrier member 14b. In the above manner, each of the three planetary roller units 22 is attached to the planetary carrier 14.

Figure 7:
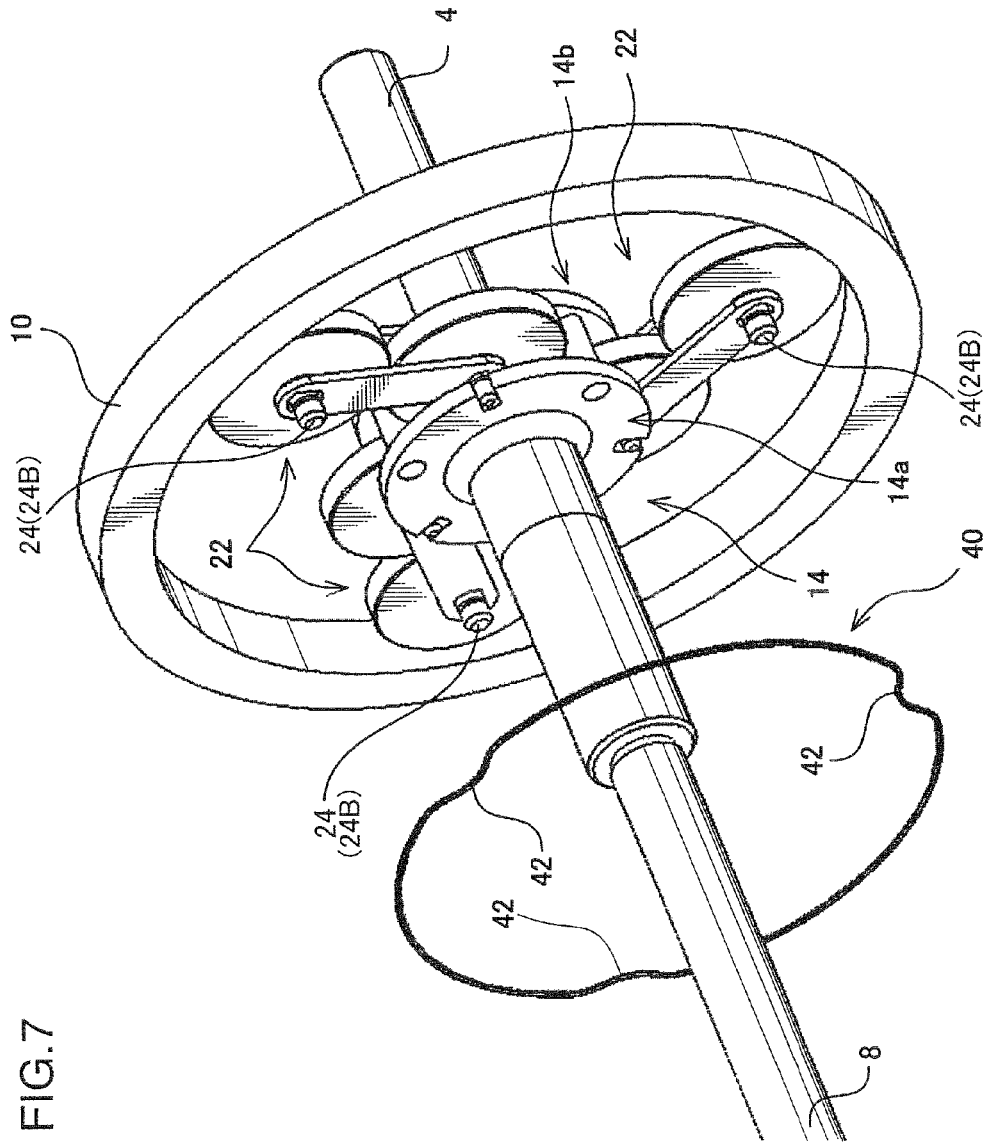
FIG. 7 is a perspective view showing a state before a pressing ring spring is attached to the planetary roller unit.
Figure 8:
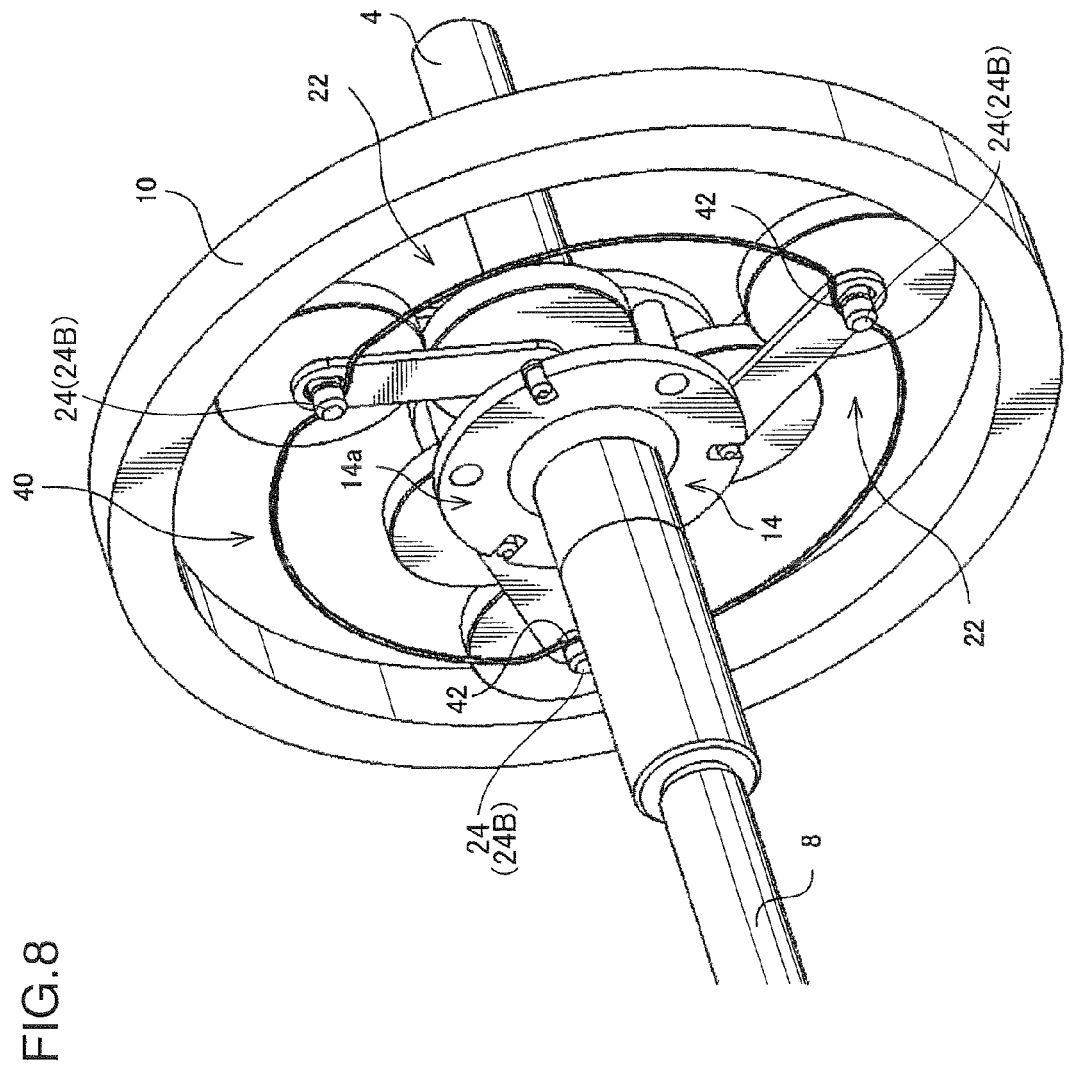
FIG. 8 is a perspective view showing a state after the pressing ring spring is attached to the planetary roller unit.

Subsequently, the outer ring 10 is disposed to surround the planetary roller units 22, and further the sun roller 4 and the output shaft 8 are installed. Then, as shown in FIGS. 7 and 8, a pressing ring spring 40 (serving as a biasing member) is installed. This ring spring 40 serves as a means to bias the three second shaft members 24B toward the pressing surface 10b of the outer ring 10 so as to press the respective outer peripheral surfaces 23b of the three second planetary rollers 22b against the pressing surface 10b.

As shown in FIG. 7, the pressing ring spring 40 is attached from the side of the output shaft 8 toward the first carrier member 14a. The ring spring 40 has three support portions 42 concaved toward a center thereof and arranged at even intervals (at intervals of 120 degrees) in conformity to the arrangement intervals of the three second shaft members 24B. Each of the support portions 42 is formed to bias the second end (on the side of the large-diameter portion) of the second shaft member 24B in the radially outward direction of the sun roller 4 weakly so as to obtain a pressing force required at start of the orbital movement (see FIG. 8). This allows the respective outer peripheral surfaces 23b of the second planetary rollers 22b to be reliably brought into contact with the pressing surface 10b of the outer ring 10.

An operation of the traction-drive type driving-force transmission mechanism will be described below. In the assembled state of the traction-drive type driving-force transmission mechanism M, the outer peripheral surface 23b of the second planetary roller 22b in each of the planetary roller units 22 is in contact with the pressing surface 10b and in contact with the outer peripheral surface 23a of the first planetary roller 22a. Further, the outer peripheral surface 23a of the first planetary roller 22a is weakly in contact with the outer peripheral surface 4a of the sun roller 4. When the sun roller 4 is rotated in a counterclockwise direction in FIG. 2, as indicated by the arrowed line in FIG. 2, the first planetary roller 22a is rotated in a clockwise direction (about the first shaft member 24A). Simultaneously, the second planetary roller 22b is rotated in the counterclockwise direction (about the second shaft member 24B). The planetary roller unit 22 is orbitally moved around the sun roller 4 in the counterclockwise direction.

Figure 9:
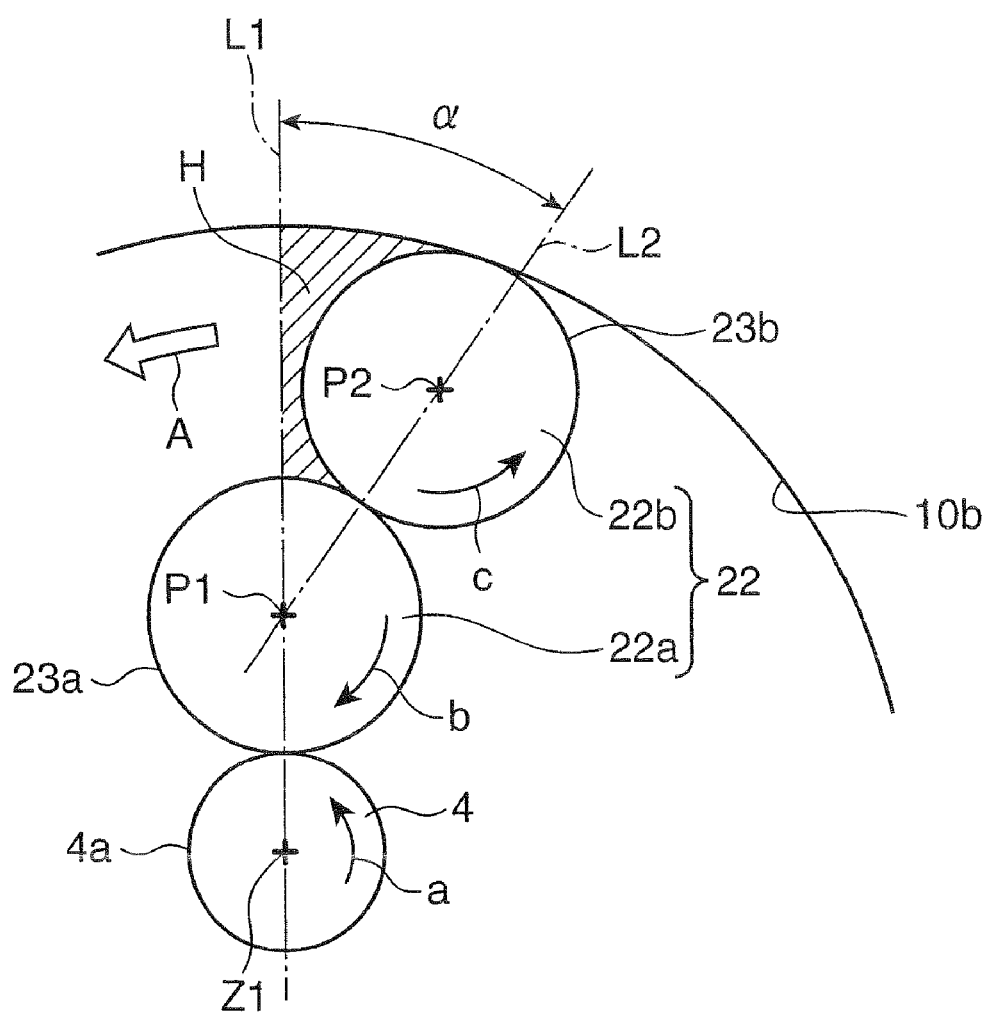
FIG. 9 is a schematic diagram for explaining an operation of the planetary roller unit.

FIG. 9 is a schematic diagram for explaining an operation of the planetary roller unit 22. In order to produce a wedge effect, a straight line L2 connecting a rotation axis P1 (central axis Z2) of the first planetary roller 22a and a rotation axis P2 of the second planetary roller 22b is disposed in such a manner as to be inclined relative to a straight line L1 connecting the rotation axis Z1 of the sun roller 4 and the rotation axis P1, by a given margin angle α. Thus, a generally wedge-shaped space H is formed on a downstream side in a direction of the orbital movement of the planetary roller unit 22 (in a counterclockwise direction indicated by the arrowed line in FIG. 9) in proportion to the margin angle α. With respect to the direction of the orbital movement, the rotation axis P2 of the second planetary roller 22b is disposed on an upstream side relative to the straight line L1, in the direction of the orbital movement of the planetary roller unit 22.

When the second planetary roller 22b is rotated in the counterclockwise direction, it will bite against the outer ring 10 while narrowing the wedge-shaped space H. According to this biting, an outward end of the planetary roller support arm 22c (, i.e., in FIG. 2, an end of the planetary roller support arm 22c having the oval-shaped portion 24 protruding therefrom) is moved in a direction for rising up relative to the first planetary roller 22a. The outer ring 10 is also rotated in the counterclockwise direction.

Then, according to a reaction force generated by biting of the second planetary roller 22b against the outer ring 10, the pressing surface presses the outer peripheral surface 23b of the second planetary roller 22b. Simultaneously, the outer peripheral surface 23b presses the outer peripheral surface 23a of the first planetary roller 22a, and thereby the first planetary roller 22a is moved toward the sun roller 4 in the radial direction thereof. Thus, the outer peripheral surface 4a of the sun roller 4 receives a strong pressing force from the outer peripheral surface 23a of the first planetary roller 22a.

Subsequently, a contact point between the pressing surface 10b and the outer peripheral surface 23b, a contact point between the outer peripheral surface 23b and the outer peripheral surface 23a, and a contact point between the outer peripheral surface 23a and the outer peripheral surface 4a, are approximately linearly aligned with each other. Then, when the first planetary roller 2a is strongly pressed against the sun roller 4, and cannot be moved any more, the outer ring 10 is rotated in the counterclockwise direction at the same speed as that of the planetary roller unit 22. In other words, the outer ring 10 is relatively stopped with respect to the planetary roller unit 22.

In this state, an ultrahigh-pressure is developed (in a fine gap) between each of the planetary roller units 22 and the sun roller 4 in the inside of the casing 2, to allow the grease nipped in the fine gap to exert its elasto-plastic property so as to generate an adequate traction force during rotation of the sun roller 4. Then, when the three first planetary rollers 22a are rotated in a direction opposite to that of the sun roller 4 by utilizing the traction force, and each of the planetary roller units 22 is moved around the sun roller 4 (i.e., orbited around the outer peripheral surface of the sun roller 4), the movement is transmitted to the planetary carrier 14 through each of the shaft members 24. Thus, the entire planetary carrier 14 is rotated in the same direction as that of the sun roller 4. This rotation of the planetary carrier 14 is picked up from the output shaft 8, so that a torque input into the sun roller 4 can be transmitted to the output shaft 8 at a desired speed reduction ratio with a high degree of accuracy. Thus, the traction-drive type driving-force transmission mechanism M can be used as a speed reducer.

A speed reducer based on the traction-drive type driving-force transmission mechanism M according to this embodiment makes it possible to smoothly transmit a torque without an influence of backlash as in a gear transmission mechanism. Thus, the traction-drive type driving-force transmission mechanism M is suitable as a driving source for an apparatus having a need for controlling a rotational angle with a high degree of accuracy.

The traction-drive type driving-force transmission mechanism M according to this embodiment is designed to allow the shaft member 24 of the first planetary roller 22a to be displaced only in the radial direction of the sun roller 4 while maintaining the parallel relation to the rotation axis of the sun roller 4. This makes it possible to prevent the rotation axis of the first planetary roller 22a from being inclined relative to the rotation axis of the sun roller 4, so as to reliably avoid uneven wear of the sun roller 4 due to edge contact of the first planetary roller 22a. Thus, the traction-drive type driving-force transmission mechanism M can ensure durability over the long term to allow an apparatus equipped with the transmission mechanism M to maintain its functionality until a product lifetime thereof.

Particularly, in this embodiment, a high pressing force is applied to the outer peripheral surface 4a of the sun roller 4 only after the orbital movement of the planetary roller units 22 is initiated. Thus, as compared with the conventional mechanism where a high pressing force is already applied to the outer peripheral surface of the sun roller just after completion of assembling of the mechanism, a longer-lifetime traction-drive type driving-force transmission mechanism M can be obtained. In addition, during the assembling operation, any force in a thrust direction (rotation direction) is not imposed on the sun roller 4 and the output shaft 8. This makes it possible to prevent adverse effects on the motor and a driven section (e.g., photosensitive drum) connected to the output shaft.

The traction-drive type driving-force transmission mechanism M according to this embodiment is designed to bias the outer peripheral surfaces of the second planetary rollers 22b toward the pressing surface 10b by the pressing ring spring 40. Thus, the second planetary rollers 22b can more reliably bite against the outer ring 10, without slipping relative to the outer ring 10. This makes it possible to obtain an adequate pressing force even in an initial stage of the orbital movement of the planetary roller units 22. This ring spring 40 is installed in a last stage of the assembling operation for the mechanism, and therefore the assembling of the planetary roller units can be efficiently performed.

The first planetary roller 22a is adapted to be pressed against the sun roller 4, and second planetary roller 22b is adapted to bite against the outer ring 10 and press the first planetary roller 22a. The total six first and second planetary rollers 22a, 22b are composed of identical components. This makes it possible to evenly transmit a pressing force from each of the planetary roller units 22 arranged at even intervals, to the sun roller 4.

Each of the planetary roller support arms 22c is adapted to transmit a pressing force from the pressing surface 10b to the first and second planetary rollers 22a, 22b. The total six support arms 22c disposed on the opposite sided of the first and second planetary rollers 22a, 22b are composed of identical components. This makes it possible to provide enhanced accuracy of centering and shaft position, and evenly transmit a pressing force from each of the planetary roller units 22 to the sun roller 4. In the transmission mechanism according to this embodiment, the number of components is increased due to the two-stage planetary roller, but the number of component types is not increased. Thus, an increase in cost can be suppressed.

Figure 10:
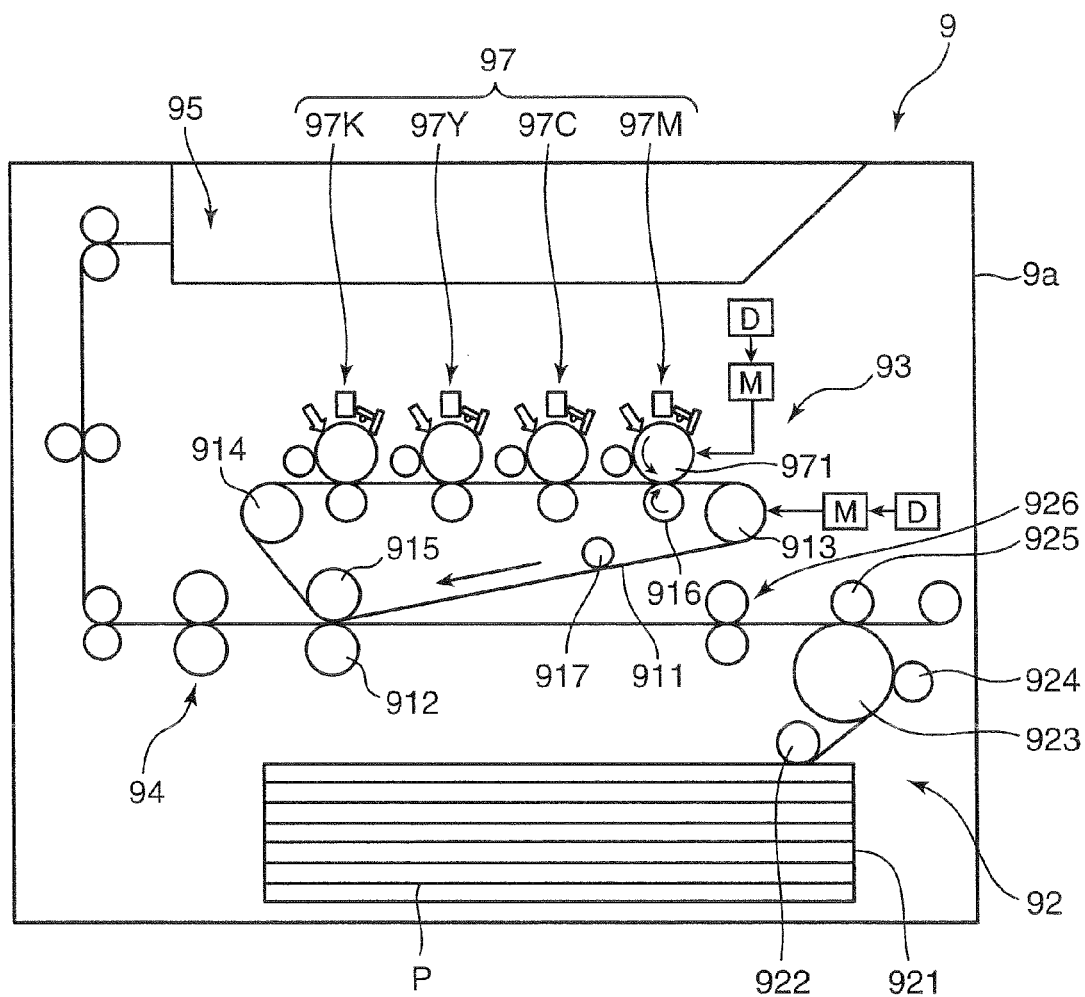
FIG. 10 is a schematic sectional view showing one example of an image forming apparatus according to one embodiment of the present invention.

As one example of an apparatus suitably equipped with the traction-drive type driving-force transmission mechanism M according to this embodiment, a full-color image forming apparatus can be represented. FIG. 10 is a schematic sectional view showing a general structure of a tandem-type color printer 9 as one example of the full-color image forming apparatus.

The color printer 9 comprises a sheet feed section 92 operable to feed a sheet P, an image forming section 93 operable to transfer an image onto the sheet P while transporting the sheet P fed from the sheet feed section 92, and a fixing section 94 operable to subject the image transferred on the sheet P in the image forming section 93 to a fixing process, which are housed in a box-shaped apparatus body 9a thereof. The apparatus body 9a has an upper surface formed as a catch tray section 95 adapted to receive the sheet P after being subjected to the fixing process in the fixing section 4.

The sheet feed section 92 is provided with a sheet feed cassette 921 adapted to store therein a plurality of sheets P, a pickup roller 922, three sheet feed rollers 923, 924, 925, and a registration roller 926. The image forming section 93 is provided with an image forming unit 97, an intermediate transfer belt 911 adapted to allow a toner image to be primarily transferred onto a surface thereof by the image forming unit 97, and a secondary transfer roller 912 operable to secondarily transfer the toner image on the intermediate transfer belt 911, onto the sheet P sent from the sheet feed cassette 921.

The image forming unit 97 includes a black unit 97K, a yellow unit 97Y, a cyan unit 97C and a magenta unit 97M, which are disposed from an upstream side (left side in FIG. 10) to an downstream side, in this order. Each of the units 97K, 97Y, 97C, 97M has a photosensitive drum 971 disposed at a central position thereof to serve as an image support member. The photosensitive drum 971 is adapted to be drivenly rotated in a counterclockwise direction in FIG. 10. A charger unit, an exposure unit, a developing unit, a cleaning unit and an eraser unit are disposed around the photosensitive drum 971 from an upstream side of a rotation direction of the photosensitive drum 871, in this order.

The intermediate transfer belt 911 comprises an endless belt-shaped rotatable member wound around a drive roller 931, a belt support roller 914, a backup roller 915, four primary transfer rollers 916 and a tension roller 917, in such a manner that an outer surface thereof is kept in contact with outer peripheral surfaces of the respective photosensitive drums 971 of the units 97K, 97Y, 97C, 97M. The intermediate transfer belt 911 is adapted to be endlessly rotated by the plurality of rollers while being pressed against each of the photosensitive drums 971 by a corresponding one of the primary transfer rollers 916 which are disposed in opposed relation to the respective photosensitive drums 971.

Toner images formed on the respective photosensitive drums 971 are sequentially transferred (primarily transferred) onto the intermediate transfer belt 911 circulatingly rotated in the arrowed direction (clockwise direction) according to driving of the drive roller 913, in a superimposed manner, to form a full-color toner image. This full-color toner image is secondarily transferred onto the sheet P in a nip zone defined between the secondary transfer roller 912 and the backup roller 915. The sheet P having the full-color toner image transferred thereon is subjected to the fixing process in the fixing section 94, and then ejected to the catch tray section 95.

In the above color printer 9, the aforementioned traction-drive type driving-force transmission mechanism M may be connected to a driving system for a component to be drivenly rotated. Particularly, the traction-drive type driving-force transmission mechanism M is preferably applied to a driving component for the image forming section 93, such as the photosensitive drum 971 and/or the intermediate transfer belt 911. A rotational driving force of a motor D (serving as a driving source) may be transmitted to a rotary shaft (serving as a driving component) of the photosensitive drum 971 or the drive roller 913 (serving as a driving component) operable to drive the intermediate transfer belt 911, through the traction-drive type driving-force transmission mechanism M. In this case, as compared with gear drive, transmission loss and uneven driving can be suppressed to achieve higher-quality image forming. Further, a stepping motor may be used as the motor. In this case, according to a pulse control of the stepping motor, a rotational angle of the photosensitive drum 971 or the like can be controlled with a high degree of accuracy to achieve significant high-quality image forming.

Although the present invention has been described based on the traction-drive type driving-force transmission mechanism M according to one embodiment thereof, it is understood that the present invention is not limited to the specific embodiment. For example, the above embodiment may be modified as follows.

(1) In the above embodiment, each of the first and second planetary rollers 22a, 22b is attached to the shaft member 24 through the bearing 26. Alternatively, the first (second) planetary roller 22a (22b) and the first (second) shaft member 24A (24B) may be designed to be integrally rotated. In this case, a bearing may be slidably provided in the planetary carrier 14 in such a manner that the shaft member 24A (24B) is guided displaceably in the radial direction of the sun roller 4 together with the bearing.

(2) The number of the planetary rollers to be provided in each of the planetary roller units 22 is not limited to two, but may be any other plural number. For example, an additional roller may be interposed between the first planetary roller 22a and the second planetary roller 22b. In this case, the planetary roller can also be pressed against the outer peripheral surface of the sun roller while maintaining in parallel relation to the sun roller, to generate a traction force evenly in the axial direction.

(3) In the above embodiment, the coupling portion 14e is connected to the boss portion 14d of the first carrier member 14a, and the base end of the output shaft 8 is fitted into the coupling portion 14e. Alternatively, the planetary carrier 14 and the output shaft 8 may be directly connected together by means of screwing. This makes it possible to simplify a machining process to facilitate reduction in cost.

In the above modification, it is preferable that the output shaft 8 is screwed with the planetary carrier 14 in a direction allowing the output shaft 8 to be tightened in a driven state thereof. In this case, as long as the output shaft 8 is screwed with the planetary carrier 14 with an adequate tightening torque during an assembling operation, any rotational fluctuation (driving delay) due to defective tightening never occurs in a rotation direction of the output shaft for any length of time, during actual use. Therefore, the connection between the planetary carrier 14 and the output shaft 8 will be reliably maintained.

Figure 11:
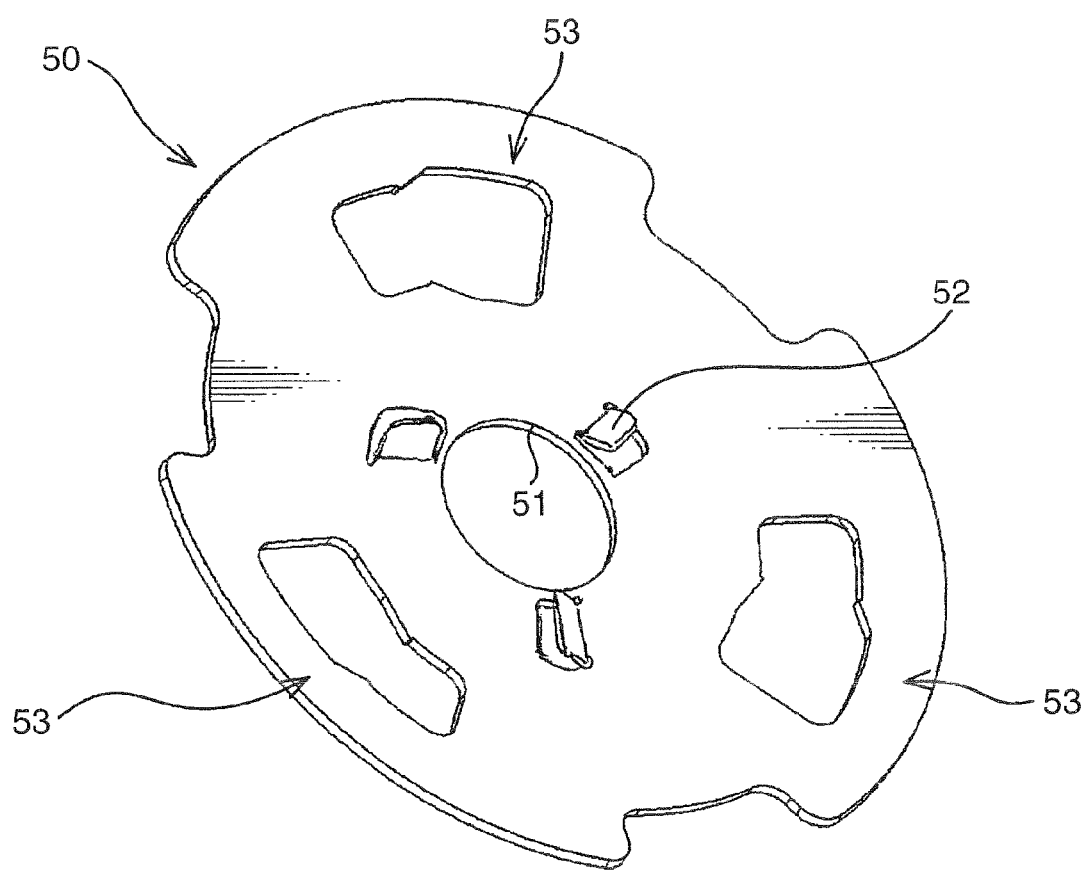
FIG. 11 is a perspective view showing one example of a circulation member.

(4) A circulation member adapted to forcedly circulate a lubricant (grease) in the inside of the casing 2 may be additionally provided. FIG. 11 is a perspective view showing one example of the circulation member 50. The circulation member 50 is disposed on the side of the outer surface of the second carrier member 14b, and has a hole 51 formed in a central region thereof to allow the sun roller 4 to be inserted thereinto. Three cut-and-bent fins 52 are formed to extend upwardly at appropriate positions on a radially outward side relative to the hole 51 and at even intervals (at intervals of 120°). Further, three engagement portions 53 are formed at appropriate positions on a radially outward side relative to the cut-and-bent fins 52 and at even intervals (at intervals of 120°). The engagement portions 53 are engaged with the respective shaft members 24.

In the above circulation member 50 assembled to the transmission mechanism M, when the planetary carrier 14 is drivenly rotated, the cut-and-bent fins 52 can forcedly circulate the grease to send the grease toward a press contact portion between the sun roller 4 and each of the first planetary rollers 22a. This makes it possible to prevent degradation of the lubricant as compared with the mechanism devoid of the circulation member, to achieve a longer lifetime of the traction-drive type driving-force transmission mechanism M.

The above specific embodiment primarily includes the invention having the following features.

In one aspect of the present invention, a traction-drive type driving-force transmission mechanism comprises: a sun roller having a first central axis and being rotatable about the first central axis; a plurality of planetary roller units each provided in such a manner as to be orbitally movable along an outer peripheral surface of the sun roller; and a pressing member which has a pressing surface surrounding the planetary roller units to press each of the planetary roller units toward the outer peripheral surface of the sun roller, and allows a driving force to be transmitted through means of a traction force between the sun roller and each of the planetary roller units, wherein each of the planetary roller units includes: first and second shaft members having respective second central axes and being disposed such that the second central axes are aligned with respective ones of two peripheral axes extending in parallel relation to the first central axis and in spaced-apart relation to each other; a first planetary roller rotatably supported by the first shaft member, and adapted to be orbitally moved along the outer peripheral surface of the sun roller; and a second planetary roller rotatably supported by the second shaft member while allowing an outer peripheral surface thereof to be in contact with an outer peripheral surface of the first planetary roller and the pressing surface, and adapted, during orbital movement of the planetary roller unit along the outer peripheral surface of the sun roller, to press the outer peripheral surface of the first planetary roller against the outer peripheral surface of the sun roller.

In the traction-drive type driving-force transmission mechanism of the present invention, a high pressing force is applied to the outer peripheral surface of the sun roller only after the orbital movement of the planetary roller units is initiated. This makes it possible to prevent uneven wear and other defect, and obtain a longer-lifetime traction-drive type driving-force transmission mechanism, as compared with the conventional mechanism where a high pressing force is already applied to the outer peripheral surface of the sun roller just after completion of assembling of the mechanism.

Preferably, in the traction-drive type driving-force transmission mechanism of the present invention, the pressing surface is a circular inner peripheral surface concentric with the sun roller, and the second central axis of the second shaft member in each of the planetary roller units is disposed on an upstream side relative to a line connecting the first central axis of the sun roller and the second central axis of the first shaft member in the planetary roller unit, in a direction of the orbital movement of the planetary roller unit along the outer peripheral surface of the sun roller.

According to this feature, a wedge effect causing an outer peripheral surface of the second planetary roller to bite against the pressing surface of the pressing member can be produced.

Preferably, in the traction-drive type driving-force transmission mechanism of the present invention, the plurality of planetary roller units are arranged at even intervals in a circumferential direction of the sun roller. Further, it is preferable that the first planetary roller and the second planetary roller in each of the planetary roller units are substantially identical components. According to this feature, a pressing force can be evenly transmitted from each of the planetary roller units to the sun roller. In the traction-drive type driving-force transmission mechanism of the present invention, the number of the planetary roller units may be three, wherein the first planetary roller in each of the three planetary roller units may be one in number, and the second planetary roller in each of the three planetary roller units may be one in number.

Preferably, the traction-drive type driving-force transmission mechanism of the present invention further comprises a biasing member biasing the respective outer peripheral surfaces of the second planetary rollers toward the pressing surface. This biasing means may comprise a ring spring having a plurality of support portions fittingly receiving therein the respective second shaft members. In this case, it is preferable that the plurality of planetary roller units are arranged at even intervals in a circumferential direction of the sun roller, whereby the second shaft members are arranged at even intervals in the circumferential direction, wherein the support portions of the ring spring are provided in conformity to the arrangement intervals of the second shaft members, and the ring spring biases the second shaft members toward the pressing surface to allow the respective outer peripheral surfaces of the second planetary rollers to be pressed against the pressing surface.

According to this feature, the second planetary rollers can more reliably bite against the pressing member without slipping relative to the pressing member. This makes it possible to obtain an adequate pressing force even in an initial stage of the orbital movement of the planetary roller units.

Preferably, the traction-drive type driving-force transmission mechanism of the present invention further comprises a link member connecting the first shaft member and the second shaft member in each of the planetary roller units. In this case, it more is preferable that the link member includes a first link member disposed on one of opposite sides of the first and second shaft members, and a second link member disposed on the other side, wherein the first link member and the second link member is substantially identical components.

According to this feature, through the link member, a pressing force from the pressing surface can be transmitted to the first and second planetary rollers. Further, when the link member includes the first and second link members disposed on the respective opposite sides of the first and second planetary rollers and composed of substantially identical components, a pressing force can be evenly transmitted from each of the planetary rollers to the sun roller.

Preferably, the traction-drive type driving-force transmission mechanism of the present invention further comprises a guide member adapted to guide each of the first shaft members in such a manner as to be displaceable in a radial direction of the sun roller, while maintaining the parallel relation between the first central axis of the sun roller and the second central axis of the first planetary roller.

According to this feature, even if each of the first shaft members is displaced in the radial direction of the sun roller, the parallel relation between the rotation axis of the first planetary roller and the rotation axis of the sun roller can be maintained. This makes it possible to generate a traction force evenly in the axial direction.

Preferably, the above traction-drive type driving-force transmission mechanism further comprises a bearing which supports the first planetary roller rotatably about the first shaft member, wherein the guide member is adapted to guide the first shaft member itself in such a manner as to be displaceable in the radial direction of the sun roller, together with the first planetary roller.

According to this feature, the shaft member supports the first planetary roller through the bearing, in such a manner that it is not rotated together with the first planetary roller. In this state, the guide member can guide the shaft member itself displaceably in the radial direction of the sun roller so as to allow the first planetary roller to be displaced in the radial direction of the sun roller while maintaining the parallel relation between the rotation axis of the first planetary roller and the rotation axis of the sun roller.

Preferably, in the above traction-drive type driving-force transmission mechanism, the guide member includes a first carrier member supported about the first central axis in a manner capable of relative rotation with respect the sun roller, a second carrier member connected to the first carrier member in spaced-apart relation in a direction of the first central axis, to support the first shaft members in cooperation with the first carrier member, while receiving the first planetary rollers in a space relative to the first carrier member, and a plurality of guide grooves formed in each of the first and second carrier members in a symmetrical manner, and each adapted to guide a corresponding one of opposite ends of a respective one of the first shaft members in such a manner as to be displaceable in the radial direction of the sun roller. In this case, each of the first shaft members preferably includes an oval-shaped portion in one of the opposite ends thereof, wherein the oval-shaped portion has a pair of opposed parallel surfaces formed by cutting out a part of an outer periphery of the one end in conformity to a width of each of the guide grooves, and wherein a width of each of the parallel surfaces in a longitudinal direction of the first shaft member is set to conform to a thickness of the first or second carrier member, whereby the oval-shaped portion restrains a displacement of the first shaft member itself in a direction causing it to be inclined relative to the sun roller.

According to this feature, the oval-shaped portion formed in the one end of the shaft member can suppress inclination of the shaft member itself to maintain the parallel relation between the rotation axis of each of the first planetary rollers, and the central axis of the sun roller. In addition, the oval-shaped portion may be formed only in one of the opposite ends of the shaft member, and the other end may be maintained in a sectionally circular shape, so as to prevent the occurrence of an angular difference between the opposite ends due to machining error. This makes it possible to allow the shaft member to be smoothly displaced (slidingly moved) along the guide groove in a parallel displacement manner so as to generate an adequate traction force between the first planetary roller and the sun roller.

Preferably, in the above traction-drive type driving-force transmission mechanism, the first carrier member has a connection portion extending toward the second carrier member in a longitudinal direction of the sun roller, and the second carrier member has a fitting concave portion formed to fittingly receive therein the connection portion in such a manner that the first and second carrier members are restrained relative to each other in a circumferential direction of the sun roller, wherein each of the first shaft members has a pair of latch portions formed in the respective opposite ends thereof in such a manner as to be retained by respective outer surfaces of the first and second carrier members located across the first planetary rollers in the longitudinal direction of the sun roller, whereby the latch portions restrain the first and second carrier members from moving apart from each other so as to maintain the fitted state between the connection portion and the fitting concave portion.

According to this feature, the latch portion of the shaft member can restrain the first and second carrier members from moving apart from each other, so as to maintain the fitted state between the connection portion and the fitting concave portion. In this case, the components (the first and second carrier members and the shaft member) can be assembled together based on only fitting relationship therebetween without using any festinating means, such as screwing, by fabricating or machining each of the components with a high degree of accuracy.

Preferably, in the traction-drive type driving-force transmission mechanism of the present invention, each of four components consisting of the sun roller, the first and second planetary rollers and the pressing member to be brought into press contact with each other is made of a material having a hardness set to become higher in descending order of surface velocity in respective press contact portions of the components. This feature makes it possible to suppress performance deterioration due to seizing or wearing, as compared with a case where the components are made of the same material and assembled together, so as to provide extended lifetime to the traction-drive type driving-force transmission mechanism.

Preferably, in the traction-drive type driving-force transmission mechanism of the present invention, each of four components consisting of the sun roller, the first and second planetary rollers and the pressing member to be brought into press contact with each other is made of a material having a hardness equal to or greater than that of at least die steel, and at least one of the components to be driven at a maximum value of surface velocity in respective press contact portions thereof has a surface subjected to a micro-shot peening treatment. This feature makes it possible to suppress performance deterioration due to wearing, as compared with a case where the component is not subjected to the treatment, so as to provide extended lifetime to the traction-drive type driving-force transmission mechanism.

Preferably, the above traction-drive type driving-force transmission mechanism further comprises an output shaft connected to the guide member in such a manner as to be drivenly rotated by the guide member, wherein the output shaft is screwed with the guide member in a direction allowing the output shaft to be tightened in a driven state thereof. According to this feature, the output shaft is screwed with the guide member in the direction allowing the output shaft to be tightened in a driven state thereof. This makes it possible to reliably maintain the connection between the guide member and the output shaft.

Preferably, the traction-drive type driving-force transmission mechanism of the present invention further comprises a casing which receives therein the first and second planetary rollers, the pressing member and a part of the sun roller, while being filled with a lubricant, and a circulation member disposed inside the casing, and adapted to forcedly circulate the lubricant. According to this feature, the lubricant is positively circulated toward the components in press contact with each other, by the circulation member. This makes it possible to prevent degradation of the lubricant so as to provide extended lifetime to the traction-drive type driving-force transmission mechanism.

In another aspect of the present invention, an image forming apparatus comprises: an image forming section including at least a photosensitive drum, or a photosensitive drum and an intermediate transfer belt; a driving source operable to generate a driving force for driving the photosensitive drum, or at least one of the photosensitive drum and the intermediate transfer belt; and a traction-drive type driving-force transmission mechanism operable to transmit the driving force of the driving source to a rotary shaft of the photosensitive drum, or a driving member of the intermediate transfer belt, wherein the traction-drive type driving-force transmission mechanism comprises: a sun roller having a first central axis and being rotatable about the first central axis; a plurality of planetary roller units each provided in such a manner as to be orbitally movable along an outer peripheral surface of the sun roller;

and a pressing member which has a pressing surface surrounding the planetary roller units to press each of the planetary roller units toward the outer peripheral surface of the sun roller, and allows the driving force to be transmitted through means of a traction force between the sun roller and each of the planetary roller units, and wherein each of the planetary roller units includes: first and second shaft members having respective second central axes and being disposed such that the second central axes are aligned with respective ones of two peripheral axes extending in parallel relation to the first central axis and in spaced-apart relation to each other; a first planetary roller rotatably supported by the first shaft member, and adapted to be orbitally moved along the outer peripheral surface of the sun roller; and a second planetary roller rotatably supported by the second shaft member while allowing an outer peripheral surface thereof to be in contact with an outer peripheral surface of the first planetary roller and the pressing surface, and adapted, during orbital movement of the planetary roller unit along the outer peripheral surface of the sun roller, to press the outer peripheral surface of the first planetary roller against the outer peripheral surface of the sun roller.

In the image forming apparatus of the present invention, the traction-drive type driving-force transmission mechanism is connected to a driving system of the photosensitive drum and/or the intermediate transfer belt. This makes it possible to rotationally control the photosensitive drum and/or the intermediate transfer belt with a higher degree of accuracy as compared with gear drive, so as to achieve higher-quality image forming.

This application is based on patent application Nos. 2007-294293, 2007-294298, 2007-294299, 2007-294300, and 2007-294301 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A traction-drive type driving-force transmission mechanism comprising:
   a sun roller having a central axis and being rotatable about said first central axis;
   a plurality of planetary roller units each provided in such a manner as to be orbitally movable along an outer peripheral surface of said sun roller; and
   a pressing member which has a pressing surface surrounding said planetary roller units to press each of said planetary roller units toward the outer peripheral surface of said sun roller, and allows a driving force to be transmitted through means of a traction force between said sun roller and each of said planetary roller units,
   wherein each of said planetary roller units includes:
   first and second shaft members having respective first and second peripheral axes extending in parallel relation to said central axis and in spaced-apart relation to each other;
   a first planetary roller rotatably supported by said first shaft member, and adapted to be orbitally moved along the outer peripheral surface of said sun roller; and
   a second planetary roller rotatably supported by said second shaft member while allowing an outer peripheral surface thereof to be in contact with an outer peripheral surface of said first planetary roller and said pressing surface, and adapted, during orbital movement of said planetary roller unit along the outer peripheral surface of said sun roller, to press the outer peripheral surface of said first planetary roller against the outer peripheral surface of said sun roller.

2. The traction-drive type driving-force transmission mechanism as defined in claim 1, wherein:
   said pressing surface is a circular inner peripheral surface concentric with said sun roller; and
   said second peripheral axis of said second shaft member in each of said planetary roller units is disposed on an upstream side relative to a line connecting said central axis of said sun roller and said first peripheral axis of said first shaft member in said planetary roller unit, in a direction of the orbital movement of said planetary roller unit along the outer peripheral surface of said sun roller.

3. The traction-drive type driving-force transmission mechanism as defined in claim 1, wherein said plurality of planetary roller units are arranged at even intervals in a circumferential direction of said sun roller.

4. The traction-drive type driving-force transmission mechanism as defined in claim 3, wherein said first planetary roller and said second planetary roller in each of said planetary roller units are substantially identical components.

5. The traction-drive type driving-force transmission mechanism as defined in claim 4, wherein the number of said planetary roller units is three, and wherein said first planetary roller in each of said three planetary roller units is one in number, and said second planetary roller in each of said three planetary roller units is one in number.

6. The traction-drive type driving-force transmission mechanism as defined in claim 1, which further comprises a biasing member biasing the respective outer peripheral surfaces of said second planetary rollers toward said pressing surface.

7. The traction-drive type driving-force transmission mechanism as defined in claim 2, which further comprises a ring spring having a plurality of support portions fittingly receiving therein said respective second shaft members, wherein:
   said plurality of planetary roller units are arranged at even intervals in a circumferential direction of said sun roller, whereby said second shaft members are arranged at even intervals in said circumferential direction;
   said support portions of said ring spring are provided in conformity to the arrangement intervals of said second shaft members; and
   said ring spring biases said second shaft members toward said pressing surface to allow the respective outer peripheral surfaces of said second planetary rollers to be pressed against said pressing surface.

8. The traction-drive type driving-force transmission mechanism as defined in claim 1, which further comprises a link member connecting said first shaft member and said second shaft member in each of said planetary roller units.

9. The traction-drive type driving-force transmission mechanism as defined in claim 8, wherein said link member includes a first link member disposed on one of opposite sides of said first and second shaft members, and a second link member disposed on the other side, said first link member and said second link member being substantially identical components.

10. The traction-drive type driving-force transmission mechanism as defined in claim 1, which further comprises a guide member adapted to guide each of said first shaft members in such a manner as to be displaceable in a radial direction of said sun roller, while maintaining the parallel relation between said central axis of said sun roller and said first peripheral axis of said first planetary roller.

11. The traction-drive type driving-force transmission mechanism as defined in claim 10, which further comprises a bearing which supports said first planetary roller rotatably about said first shaft member, wherein said guide member is adapted to guide said first shaft member itself in such a manner as to be displaceable in the radial direction of said sun roller, together with said first planetary roller.

12. The traction-drive type driving-force transmission mechanism as defined in claim 11, wherein said guide member includes:
 a first carrier member supported about said first central axis in a manner capable of relative rotation with respect to said sun roller;
 a second carrier member connected to said first carrier member in spaced-apart relation in a direction of said first central axis, to support said first shaft members in cooperation with said first carrier member, while receiving said first planetary rollers in a space relative to said first carrier member; and
 a plurality of guide grooves formed in each of said first and second carrier members in a symmetrical manner, and each adapted to guide a corresponding one of opposite ends of a respective one of said first shaft members in such a manner as to be displaceable in the radial direction of said sun roller.

13. The traction-drive type driving-force transmission mechanism as defined in claim 12, wherein each of said first shaft members includes an oval-shaped portion in one of the opposite ends thereof, said oval-shaped portion having a pair of opposed parallel surfaces formed by cutting out a part of an outer periphery of said one end in conformity to a width of each of said guide grooves, wherein a width of each of said parallel surfaces in a longitudinal direction of said first shaft member is set to conform to a thickness of said first or second carrier member, whereby said oval-shaped portion restrains a displacement of said first shaft member itself in a direction causing it to be inclined relative to said sun roller.

14. The traction-drive type driving-force transmission mechanism as defined in claim 13, wherein:
 said first carrier member has a connection portion extending toward said second carrier member in a longitudinal direction of said sun roller;
 said second carrier member has a fitting concave portion formed to fittingly receive therein said connection portion in such a manner that said first and second carrier members are restrained relative to each other in a circumferential direction of said sun roller; and
 each of said first shaft members has a pair of latch portions formed in the respective opposite ends thereof in such a manner as to be retained by respective outer surfaces of said first and second carrier members located across said first planetary rollers in the longitudinal direction of said sun roller, whereby said latch portions restrain said first and second carrier members from moving apart from each other so as to maintain the fitted state between said connection portion and said fitting concave portion.

15. The traction-drive type driving-force transmission mechanism as defined in claim 1, wherein each of four components consisting of said sun roller, said first and second planetary rollers and said pressing member to be brought into press contact with each other is made of a material having a hardness set to become higher in descending order of surface velocity in respective press contact portions of said components.

16. The traction-drive type driving-force transmission mechanism as defined in claim 1, wherein each of four components consisting of said sun roller, said first and second planetary rollers and said pressing member to be brought into press contact with each other is made of a material having a hardness equal to or greater than that of at least die steel, and at least one of said components to be driven at a maximum value of surface velocity in respective press contact portions thereof has a surface subjected to a micro-shot peening treatment.

17. The traction-drive type driving-force transmission mechanism as defined in claim 10, which further comprises an output shaft connected to said guide member in such a manner as to be drivenly rotated by said guide member, said output shaft being screwed with said guide member in a direction allowing said output shaft to be tightened in a driven state thereof.

18. The traction-drive type driving-force transmission mechanism as defined in claim 1, which further comprises:
 a casing which receives therein said first and second planetary rollers, said pressing member and a part of said sun roller, while being filled with a lubricant; and
 a circulation member disposed inside said casing, and adapted to forcedly circulate said lubricant.

19. An image forming apparatus comprising:
 an image forming section including at least a photosensitive drum, or a photosensitive drum and an intermediate transfer belt;
 a driving source operable to generate a driving force for driving said photosensitive drum, or at least one of said photosensitive drum and said intermediate transfer belt; and
 a traction-drive driving-force transmission mechanism operable to transmit the driving force of said driving source to a rotary shaft of said photosensitive drum, or a driving member of said intermediate transfer belt, said traction-drive driving-force transmission mechanism comprising:
 a sun roller having a central axis and being rotatable about said central axis;
 a plurality of planetary roller units each provided in such a manner as to be orbitally movable along an outer peripheral surface of said sun roller; and
 a pressing member which has a pressing surface surrounding said planetary roller units to press each of said planetary roller units toward the outer peripheral surface of said sun roller, and allows the driving force to be transmitted through means of a traction force between said sun roller and each of said planetary roller units,
 wherein each of said planetary roller units includes:
 first and second shaft members having respective first and second peripheral axes extending in parallel relation to said central axis and in spaced-apart relation to each other;
 a first planetary roller rotatably supported by said first shaft member, and adapted to be orbitally moved along the outer peripheral surface of said sun roller; and
 a second planetary roller rotatably supported by said second shaft member while allowing an outer peripheral surface thereof to be in contact with an outer peripheral surface of said first planetary roller and said pressing surface, and adapted, during orbital movement of said planetary roller unit along the outer peripheral surface of said sun roller, to press the outer peripheral surface of said first planetary roller against the outer peripheral surface of said sun roller.

* * * * *